US011850687B2

(12) United States Patent
Sakai

(10) Patent No.: US 11,850,687 B2
(45) Date of Patent: Dec. 26, 2023

(54) METAL LAMINATING AND MODELING METHOD AND MODELED ARTICLE

(71) Applicant: MITSUBISHI HEAVY INDUSTRIES COMPRESSOR CORPORATION, Tokyo (JP)

(72) Inventor: Yasunori Sakai, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 445 days.

(21) Appl. No.: 17/022,357

(22) Filed: Sep. 16, 2020

(65) Prior Publication Data

US 2021/0094113 A1    Apr. 1, 2021

(30) Foreign Application Priority Data

Sep. 27, 2019 (JP) .................................. 2019-176512

(51) Int. Cl.
*B23K 9/04* (2006.01)
*B23K 9/095* (2006.01)
*B33Y 10/00* (2015.01)

(52) U.S. Cl.
CPC .............. *B23K 9/042* (2013.01); *B23K 9/095* (2013.01); *B33Y 10/00* (2014.12)

(58) Field of Classification Search
CPC ...... B23K 9/042; B23K 9/095; B23K 26/342; B33Y 10/00; B33Y 3/00
See application file for complete search history.

(56) References Cited

U.S. PATENT DOCUMENTS 5,207,371 A      5/1993   Prinz et al.
2013/0032577 A1*  2/2013   Lin ...................... B23K 9/1735
                                                  219/76.12
(Continued)

FOREIGN PATENT DOCUMENTS

GB          1521422 A        8/1978
JP        S51135854 A       11/1976
(Continued)

OTHER PUBLICATIONS

Wang Xiaolong et al: "A sequential path-planning methodology for wire and arc additive manufacturing based on a water-pouring rule", The International Journal of Advanced Manufacturing Technology, Springer, London, vol. 103, No. 9, May 10, 2019 (May 10, 2019), pp. 3813-3830, XP036847365. ISSN: 0268-3768, DOI: 10.1007 /S00170-019-03706-1 (18 pages).

(Continued)

*Primary Examiner* — Nathaniel E Wiehe
*Assistant Examiner* — Dilnessa B Belay
(74) *Attorney, Agent, or Firm* — Osha Bergman Watanabe & Burton LLP

(57) ABSTRACT

Provided is a metal laminating and modeling method including sequentially carrying out a step of laminating metal layer to form a modeled article, in which the step of laminating a metal layers includes a step of forming blocking beads that are continuous along the outer peripheral shape of the modeled article by arc welding on at least one end portion in the width direction of a target surface, on which the metal layers are to be formed, and a step of forming inner beads by arc welding with a current higher than the current in the step of forming blocking beads so as to fill a space on the inside of the blocking beads in the width direction of the target surface.

11 Claims, 22 Drawing Sheets

(56) References Cited

U.S. PATENT DOCUMENTS

| | | | |
|---|---|---|---|
| 2017/0144242 A1* | 5/2017 | McQueen | B23K 9/173 |
| 2018/0319097 A1 | 11/2018 | Narayanan et al. | |
| 2019/0134732 A1 | 5/2019 | Sakai et al. | |
| 2019/0344388 A1 | 11/2019 | Gyotoku et al. | |
| 2019/0366463 A1* | 12/2019 | Kishikawa | B23K 9/0256 |
| 2020/0324357 A1 | 10/2020 | Sakai | |
| 2021/0178502 A1 | 6/2021 | Yamasaki et al. | |
| 2021/0379685 A1* | 12/2021 | Sato | B22F 12/224 |

FOREIGN PATENT DOCUMENTS

| | | |
|---|---|---|
| JP | H05192767 A | 8/1993 |
| JP | 2007-275945 A | 10/2007 |
| JP | 2013-146753 A | 8/2013 |
| JP | 2015-182083 A | 10/2015 |
| JP | 2018-103225 A | 7/2018 |
| JP | 2018-176269 A | 11/2018 |
| JP | 2018-187679 A | 11/2018 |
| JP | 2019-084553 A | 6/2019 |
| JP | 2019-089126 A | 6/2019 |
| JP | 2020-171946 A | 10/2020 |

OTHER PUBLICATIONS

Donghong Ding et al: "A tool-path generation strategy for wire and arc additive manufacturing", The International Journal of Advanced Manufacturing Technology, vol. 73, No. 1-4, Apr. 11, 2014 (Apr. 11, 2014), pp. 173-183, XP055472255, London ISSN: 0268-3768, DOI:10.1007/s00170-014-5808-5 (12 pages).

* cited by examiner

METAL LAMINATING AND MODELING METHOD AND MODELED ARTICLE

BACKGROUND OF THE INVENTION

Field of the Invention

The present disclosure relates to a metal laminating and modeling method and a modeled article. Priority is claimed on Japanese Patent Application No. 2019-176512, filed Sep. 27, 2019, the content of which is incorporated herein by reference.

Description of Related Art

As one 3D printing (three-dimensional modeling) technique, a technique of laminating and modeling metal has been developed and put into practical use. As such a metal laminating and modeling method, one in which a modeled article is formed by laminating metal layers using metal melted by an arc discharge has been developed. The metal layer is formed by forming a plurality of weld beads using metal melted by an arc discharge and arranging these weld beads.

For example, Japanese Unexamined Patent Application, First Publication No. 2018-176269 discloses a method for manufacturing a structure including a step of laminating and modeling the outer shell of the structure by laminating molten beads and a step of pouring molten cast metal into the inside space of the outer shell and forming a casting part inside the outer shell. The molten beads are obtained by melting and solidifying a filler metal using an arc.

SUMMARY OF THE INVENTION

However, in the metal laminating and modeling as described in Japanese Unexamined Patent Application, First Publication No. 2018-176269, there is a desire for an improvement in the manufacturing speed.

However, in the case of laminating molten beads and laminating and modeling the outer shell (modeled article), high-speed arc welding at a high temperature may cause the drop of melted metal (molten metal) during modeling. Attachment of the dropped molten metal to the outer peripheral surface or the like of the modeled article impairs the surface quality. In addition, since the drop of the molten metal causes a defect on the portion where the molten metal used to be, it is necessary to remove the molten metal and laminate new molten beads, which makes the time for the formation of the modeled article longer.

The present disclosure has been made in order to solve the above-described problem, and an object of the present disclosure is to provide a metal laminating and modeling method capable of modeling a modeled article having a favorable quality at a high speed and a modeled article.

In order to achieve the above-described object, in a metal laminating and modeling method according to the present disclosure, a modeled article is formed by sequentially carrying out a step of laminating a metal layer. The step of laminating a metal layer includes a step of forming blocking beads and a step of forming inner beads. In the step of forming blocking beads, blocking beads that are continuous along the outer peripheral shape of the modeled article are formed by arc welding on at least one end portion in the width direction of the target surface on which the metal layers are to be formed. In the step of forming inner beads, inner beads are formed by arc welding with a current higher than the current in the step of forming blocking beads so as to fill the space on the inside of the blocking beads in the width direction of the target surface.

A modeled article according to the present disclosure is a modeled article formed by laminating a plurality of metal layers each formed of weld beads. In each layer of the metal layers, a plurality of rows of the weld beads is disposed side by side in the width direction. The plurality of rows of weld beads include blocking beads that form the outer shape of the metal layer on the outside in the width direction and inner beads disposed on the inside of the blocking beads in the width direction. The inner bead is a high-current solidified bead arc-welded with a current higher than the current for the blocking bead.

According to the metal laminating and modeling method and the modeled article of the present disclosure, it is possible to model a modeled article having a favorable quality at a high speed.

DETAILED DESCRIPTION OF THE INVENTION

First Embodiment

Hereinafter, a metal laminating and modeling method and a modeled article according to embodiments of the present disclosure will be described with reference to the drawings.

(Overall Configuration of Modeling System)

Figure 1:
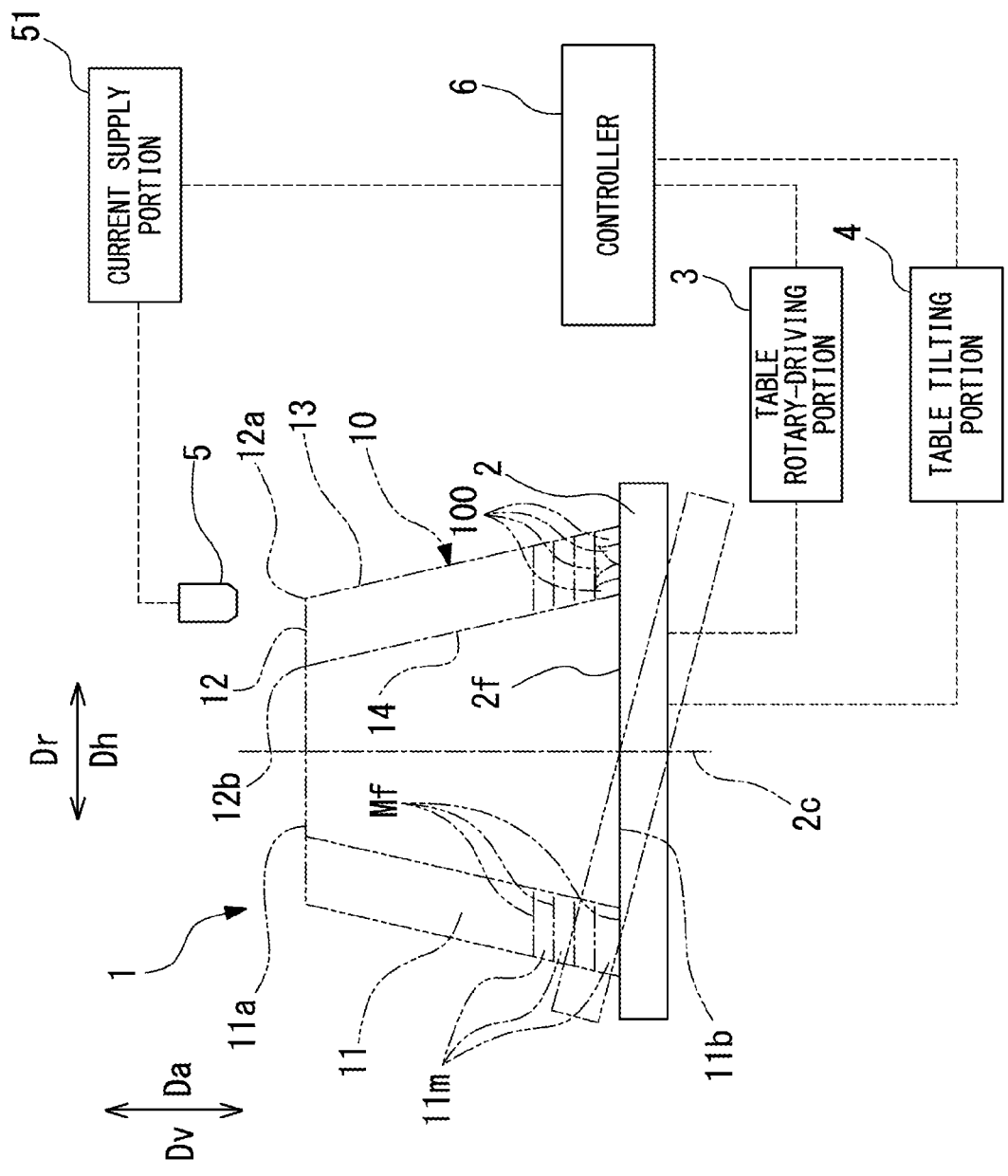
FIG. 1 is a schematic view of the configuration of a modeling system for forming a modeled article using a metal laminating and modeling method according to an embodiment of the present disclosure.

FIG. 1 is a schematic view of the configuration of a modeling system for forming a modeled article using a metal laminating and modeling method according to an embodiment of the present disclosure. As shown in FIG. 1, a modeling system 1 of the embodiment of the present disclosure includes a table 2, a table rotary-driving portion 3, a table tilting portion 4, a welding nozzle 5, and a controller 6. The modeling system 1 includes a machining center or the like capable of carrying out so-called numerical control (NC).

(Configuration of Table)

The table 2 has a table upper surface 2f facing upward in the vertical direction Dv. The table upper surface 2f is a flat surface extending from the central axis 2c of the table 2 as the center in a direction orthogonal to the central axis 2c. On the table upper surface 2f, metal layers 11m intended to form a modeled article 10 are sequentially laminated. The table 2 is rotatable around the central axis 2c. The table 2 is tiltable such that the central axis 2c inclines at a predetermined angle with respect to the vertical direction Dv. The table 2 is in the horizontal state when the central axis 2c extends in the vertical direction Dv, and the table upper surface 2f is directed upward in the vertical direction Dv.

The table rotary-driving portion 3 rotates the table 2 around the central axis 2c.

The table tilting portion 4 tilts the table 2. The table tilting portion 4 tilts the table 2 such that the table upper surface 2f is directed in a direction in which the table inclines from the horizontal state.

(Configuration of Welding Nozzle)

The welding nozzle 5 forms weld beads 100 by arc welding in which a weld wire is melted by an arc generated in a shielding gas (inert gas). The welding nozzle 5 is movable relative to the table 2. The welding nozzle 5 is installed in a multiaxial arm (not shown) that is movable relative to the table 2.

The welding nozzle 5 melts the weld wire by arc welding while the table 2 is rotated around the central axis 2c, thereby forming the weld beads 100 on the table upper surface 2f of the table 2 or the metal layer 11 in laminated on the table upper surface 2f. The weld beads 100 formed as described above form an arc shape (annular shape) that is continuous in the peripheral direction around the central axis 2c of the table 2.

The welding nozzle 5 includes a current supply portion 51 that supplies a current to the weld wire. The current supply portion 51 is capable of adjusting (switching) the magnitude of the welding current, which supplies a heat source for melting the weld wire, according to the control by the controller 6.

(Hardware Configuration View of Controller)

Figure 2:
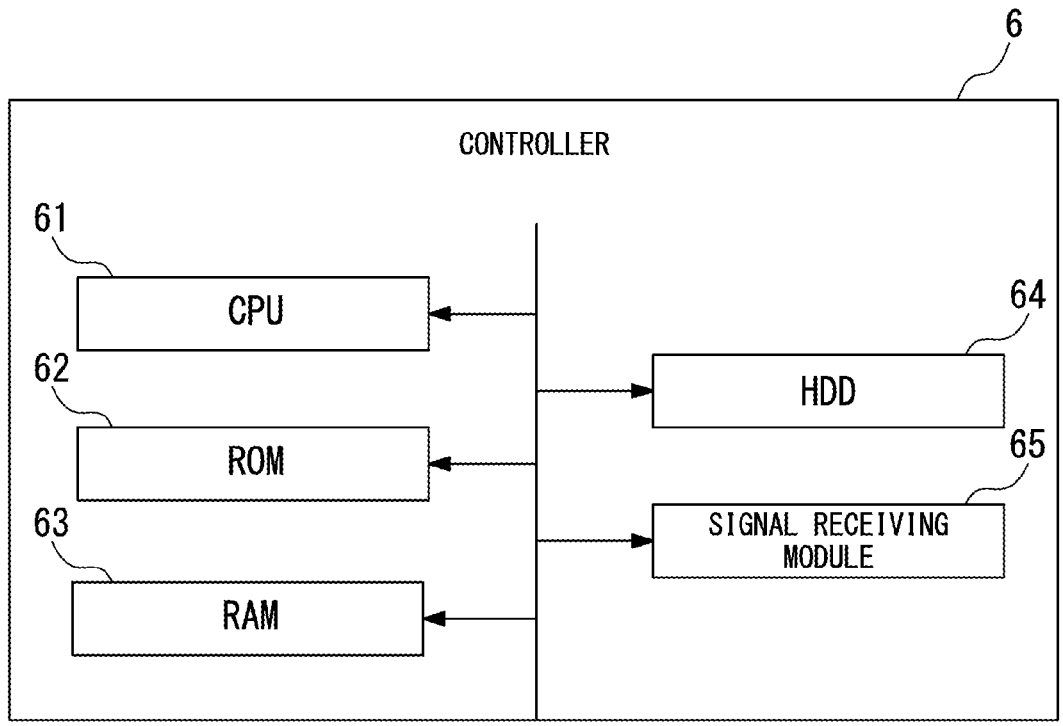
FIG. 2 is a view of the hardware configuration of a controller in the modeling system according to the embodiment of the present disclosure.

The controller 6 controls each portion of the modeling system 1. As shown in FIG. 2, the controller 6 is a computer including a central processing unit 61 (CPU), a read only memory 62 (ROM), a random access memory 63 (RAM), a hard disk drive 64 (HDD), a signal receiving module 65, and the like. The signal receiving module 65 receives a detection signal from each sensor (not shown) provided in the table rotary-driving portion 3 or the table tilting portion 4.

(Functional Block Diagram of Controller)

Figure 3:
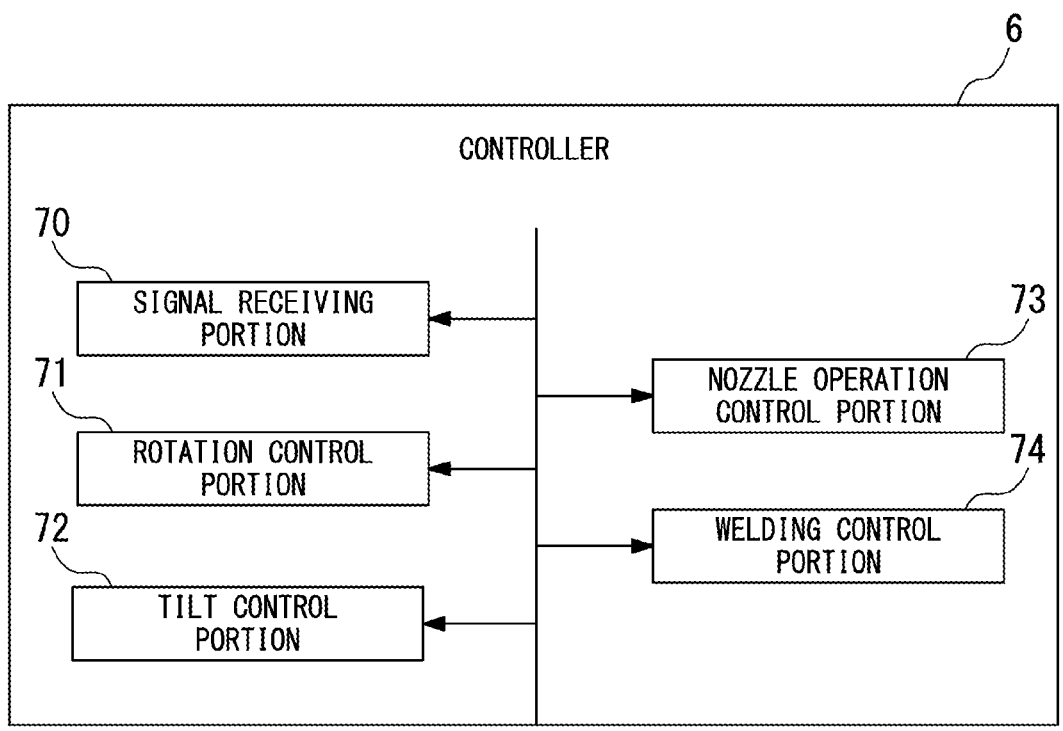
FIG. 3 is a functional block diagram of the controller in the modeling system according to the embodiment of the present disclosure.

As shown in FIG. 3, the controller 6 causes the CPU 61 to execute a program stored in advance in the controller, thereby realizing the functional configuration of each of a signal input portion 70, a rotation control portion 71, a tilt control portion 72, a nozzle operation control portion 73, and a welding control portion 74.

The signal input portion 70 receives the detection signal from each sensor (not shown) using the signal receiving module 65.

The rotation control portion 71 controls the table rotary-driving portion 3 to control the rotation operation of the table 2 around the central axis 2c. The rotation control portion 71 controls the start and stop of the rotation of the table 2. In addition, the rotation control portion 71 controls the welding speed of the welding nozzle 5 by controlling the rotation speed of the table 2.

The tilt control portion 72 controls the tilting operation of the table upper surface 2f (refer to FIG. 1) of the table 2 by controlling the table tilting portion 4.

The nozzle operation control portion 73 controls the operation of changing the relative position and posture of the welding nozzle 5 with respect to the table 2 by controlling the operation of the multiaxial arm (not shown). The nozzle operation control portion 73 controls the weaving condition that adjusts the width or shape of the weld bead 100 by, for example, reciprocating the welding nozzle 5 in the radial direction from the central axis 2c of the table 2. In addition, the nozzle operation control portion 73 controls the aiming position of a welding arc at the already-formed weld beads 100.

The welding control portion 74 controls the supply of the welding current to the welding nozzle 5 in the current supply portion 51. In the present embodiment, the welding control portion 74 switches the welding current, which is to be supplied to the welding nozzle 5 in the current supply portion 51, between two stages of a first welding current value AL and a second welding current value AH. The first welding current value AL is a current value lower than the second welding current value AH and is, for example, 150 to 350 A. A more preferable range of the first welding current value AL is 200 to 300 A. A still more preferable range of the first welding current value AL is 230 to 280 A. The second welding current value AH is a current value higher than the first welding current value AL and is, for example, 400 to 800 A. A more preferable range of the second welding current value AH is 450 to 750 A. A still more preferable range of the second welding current value AH is 600 to 700 A.

The welding control portion 74 also controls a variety of welding conditions in the welding nozzle 5. Examples of the welding conditions that the welding control portion 74 controls include the arc voltage, the pulse current, the preheating temperature of the weld wire (base material), the temperature between passes, the surface roughness of the modeled article 10 in the middle of modeling, the feed rate of the weld wire, the diameter of the weld wire, the protrusion length of the weld wire, the composition or flow rate of the shielding gas, and the like. The welding control portion 74 controls at least one of the above-described welding conditions.

(Modeled Article)

As shown in FIG. 1, the modeled article 10 that is formed with the above-described modeling system 1 is formed on the table 2. The modeled article 10 of the present embodiment has a tubular portion 11 having a cylindrical shape. Examples of the modeled article 10 having the tubular portion 11 include a nozzle that forms a suction port or an ejection port in the casing of rotary machinery such as a turbine or a compressor. The tubular portion 11 is formed on the table 2 in a state in which the axial line of the tubular portion is aligned with the central axis 2c. The tubular portion 11 extends in an axial direction Da in which the axial line extends. The axial direction Da of the present embodiment coincides with the vertical direction Dv in a case where the table 2 is put into the horizontal state.

The outer diameter dimension and inner diameter dimension of the tubular portion 11 gradually increase from a tube end 11a on one side (first side) toward a tube end 11b on the other side (second side) in the axial direction Da. Therefore, the tubular portion 11 obliquely extends upward from the table upper surface 2f of the table 2 so as to gradually approach the central axis 2c. The tubular portion 11 has a top surface 12, an outer peripheral surface 13, and an inner peripheral surface 14.

The top surface 12 is formed at an end portion of the tubular portion 11 in the axial direction Da. The top surface 12 extends so as to be orthogonal to the axial direction Da. The top surface 12 is, between the surfaces of the tubular portion 11 on the table 2, which are directed outward in the axial direction Da, the surface that is not in contact with the table upper surface 2f. The top surface 12 of the present embodiment is a flat surface forming an annular shape when seen in the axial direction Da.

When seen in the direction orthogonal to the central axis 2c, the outer peripheral surface 13 extends in a direction intersecting with the top surface 12 from an outside end portion 12a of the top surface 12 on the outermost side in the radial direction Dr. The outer peripheral surface 13 of the present embodiment is a curving surface. The radial direction Dr of the present embodiment is a direction that extends orthogonal to the axial direction Da from the axial line of the tubular portion 11 and is the horizontal direction Dh in a case where the table 2 is put into the horizontal state. When seen in the direction orthogonal to the central axis 2c, the inner peripheral surface 14 extends in the direction intersecting with the top surface 12 from an inside end portion 12b of the top surface 12 on the innermost side in the radial direction Dr. The inner peripheral surface 14 of the present embodiment extends at an angle that is almost zero degrees with respect to the outer peripheral surface 13. The inner peripheral surface 14 of the present embodiment is a curving surface.

(Order of Treatments in Metal Laminating and Modeling Method)

Figure 4:
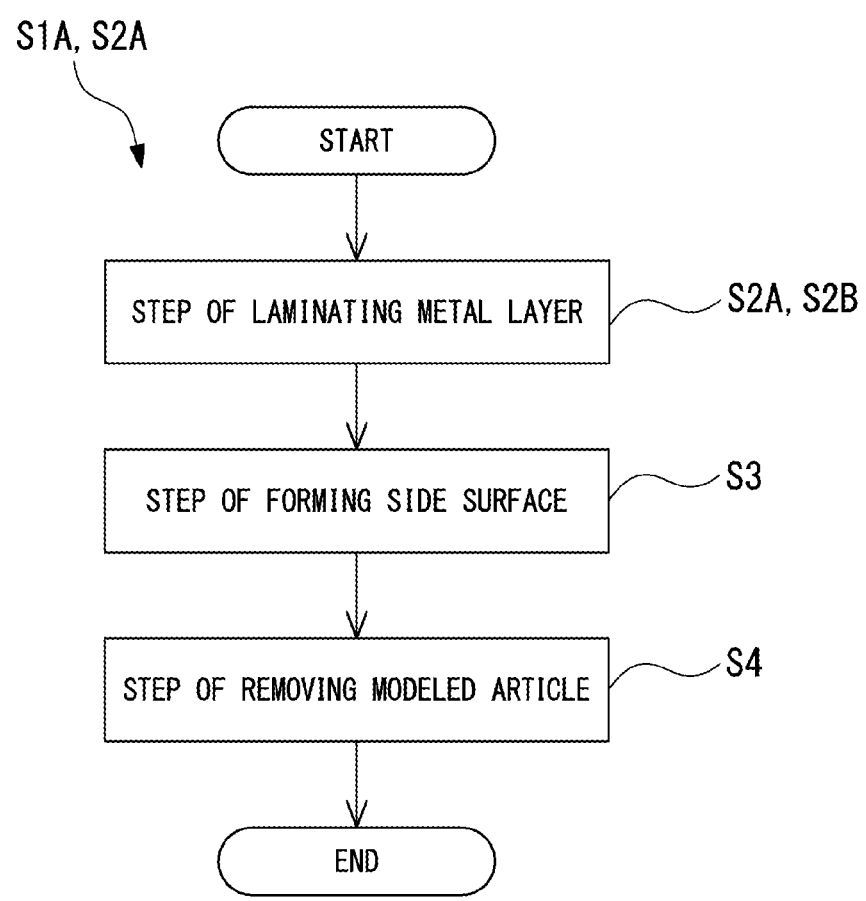
FIG. 4 is a flowchart of a metal laminating and modeling method according to a first embodiment of the present disclosure.

Next, a metal laminating and modeling method S1A that is carried out using the modeling system 1 will be described. FIG. 4 is a flowchart of the metal laminating and modeling method.

As shown in FIG. 4, in the metal laminating and modeling method S1A, a plurality of metal layers is sequentially laminated, thereby modeling a three-dimensional modeled article. The metal laminating and modeling method S1A of the present embodiment includes a step S2A of laminating a metal layer, a step S3 of forming a side surface, and a step S4 of removing a modeled article. The step S3 of forming a side surface may be omitted.

(Metal Layer Lamination Step)

In the step S2A of laminating a metal layer, as shown in FIG. 1, the weld beads 100 are formed on the table upper surface 2f of the table 2 or on the metal layer 11m laminated on the table upper surface 2f. Here, the table upper surface 2f of the table 2 or the upper surface of the metal layer 11m that has been already laminated on the table upper surface 2f on which the weld beads 100 are to be newly formed in the step S2A of laminating a metal layer is referred to as the target surface Mf. The target surface Mf is a region facing the welding nozzle 5 on the table upper surface 2f of the table 2 or on the upper surface of the metal layer Elm that has been already laminated on the table upper surface 2f.

In the step S2A of laminating a metal layer, the weld beads 100, which are formed by arc welding, are formed so as to be arranged in a plurality of rows on the target surface Mf, thereby forming the metal layer 11m. Here, the direction in which the plurality of rows of weld beads 100 is arranged on the target surface Mf is referred to as the width direction Dw of the target surface Mf. The width direction Dw coincides with the radial direction Dr.

The step S2A of laminating a metal layer is executed a plurality of times. The step S2A of laminating a metal layer is repeatedly executed, whereby a plurality of metal layers 11m is laminated on the table upper surface 2f. In the present embodiment, all of the weld beads 100 are formed of the same weld wire.

Figure 5:
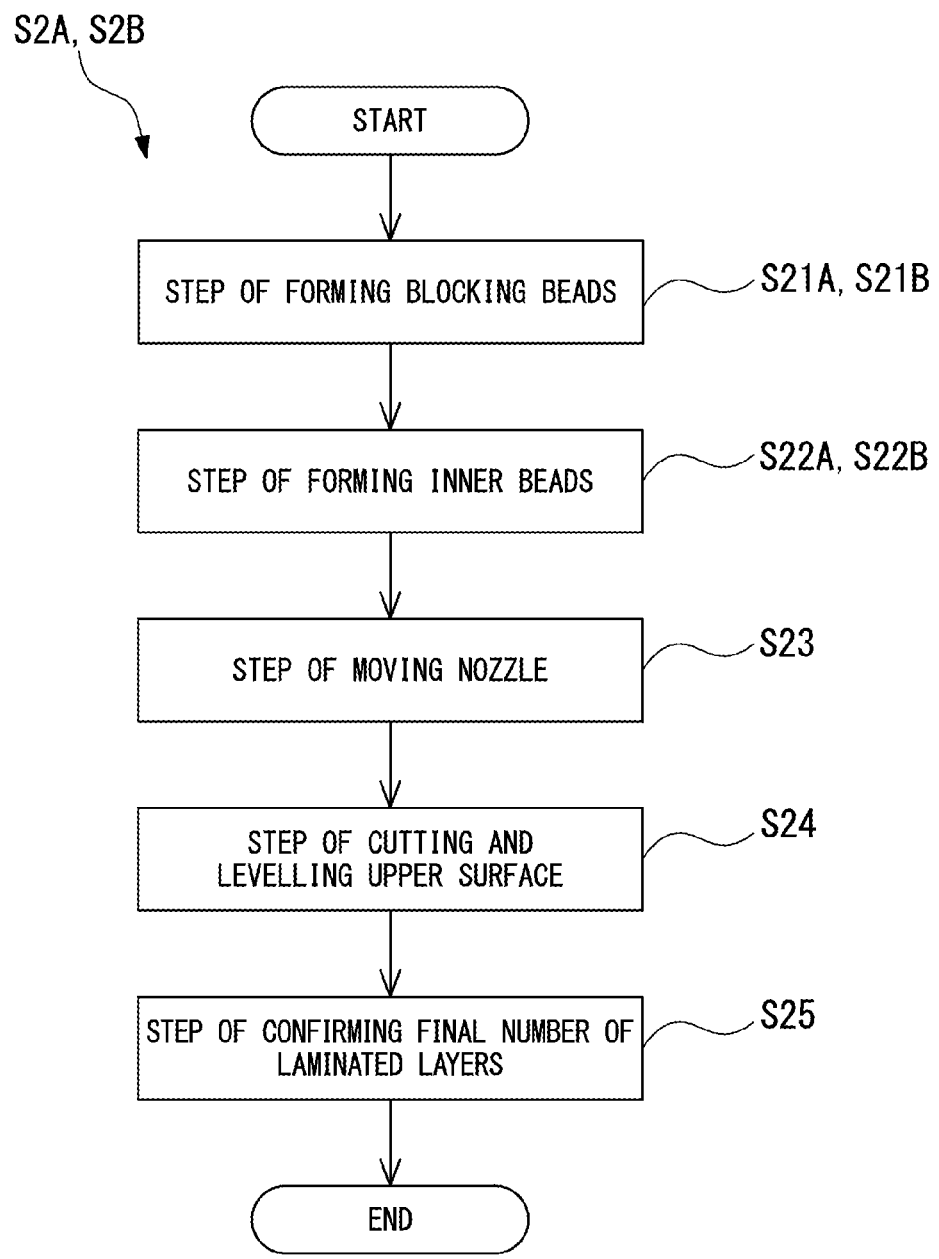
FIG. 5 is a flowchart of a step of laminating a metal layer according to the first embodiment of the present disclosure.

FIG. 5 is a flowchart of the step of laminating a metal layer.

As shown in FIG. 5, the step S2A of laminating a metal layer of the present embodiment includes a step S21A of forming blocking beads, a step S22A of forming inner beads, a step S23 of moving the nozzle, a step S24 of cutting and levelling an upper surface, and a step S25 of confirming the final number of laminated layers.

(Step of Forming Blocking Beads)

Figure 6:
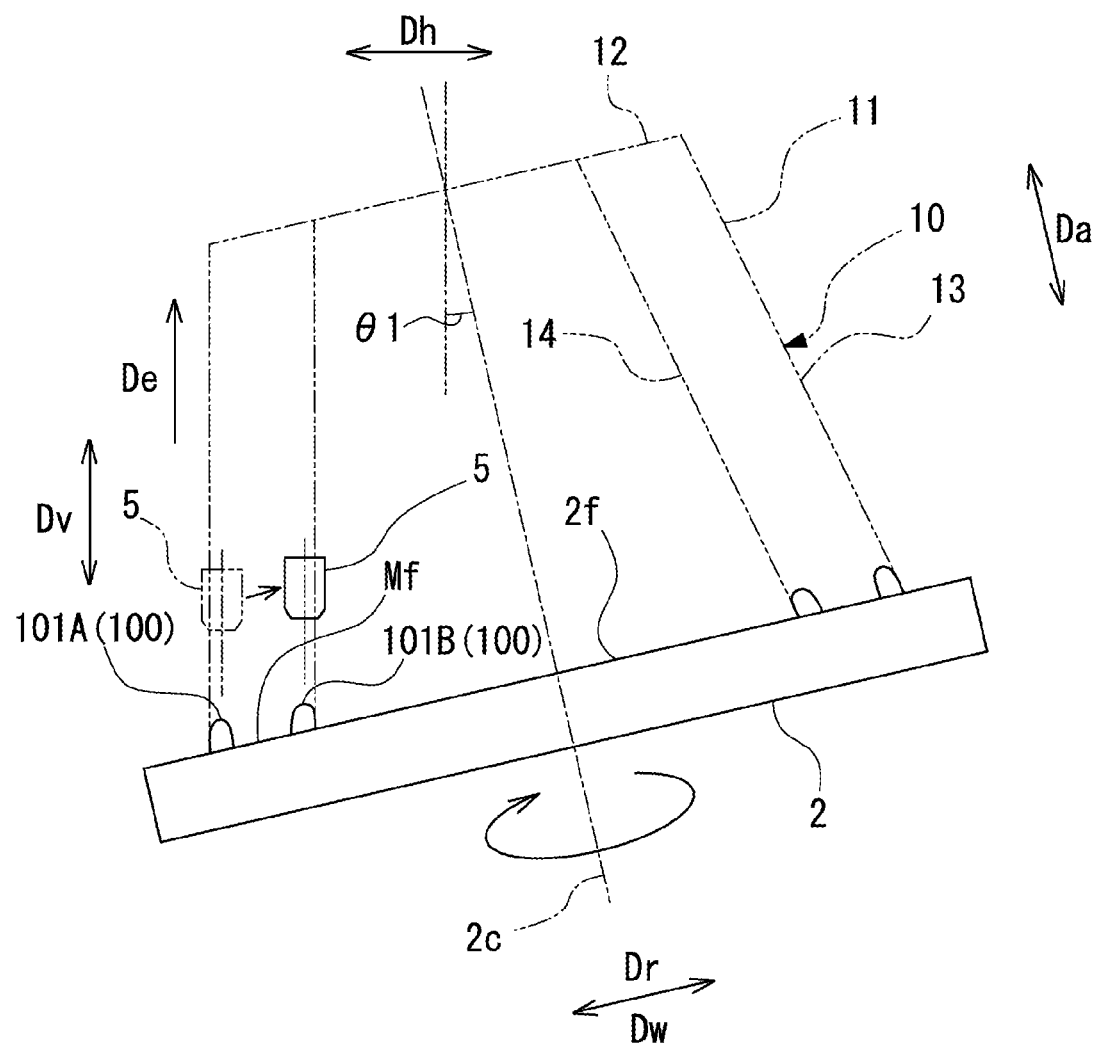
FIG. 6 is a view of a step of forming blocking beads according to the first embodiment of the present disclosure.
Figure 7:
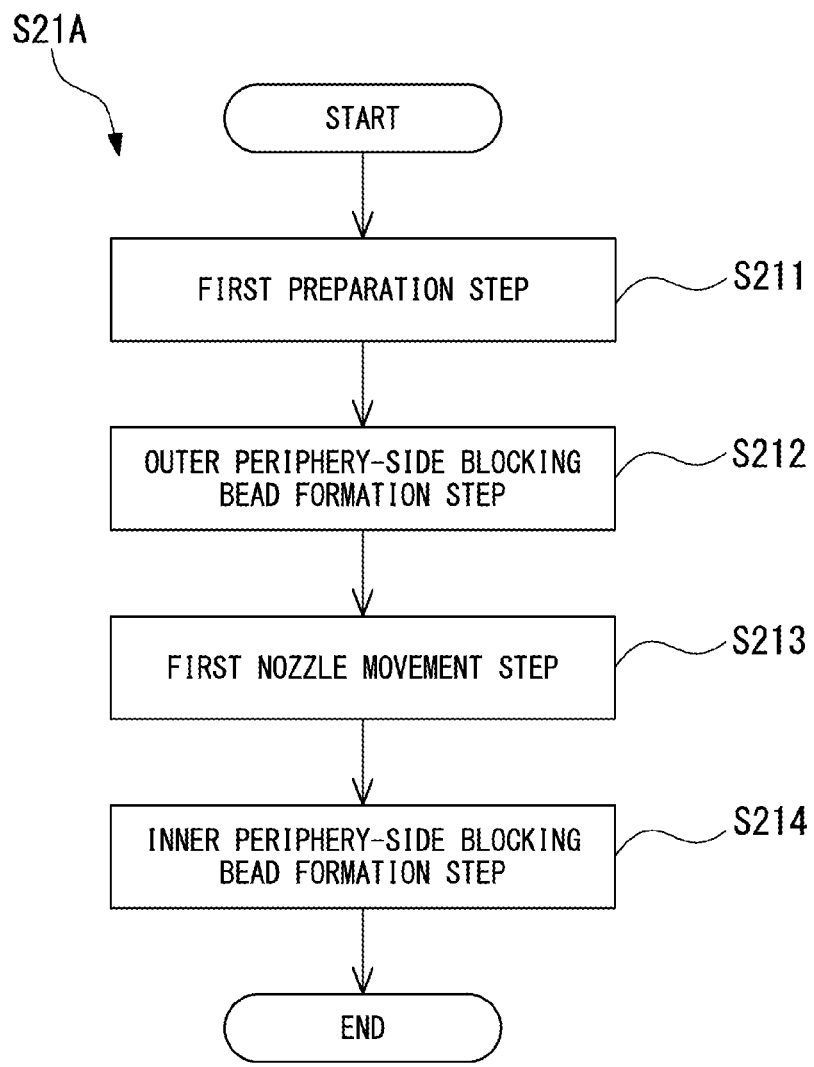
FIG. 7 is a flowchart of the step of forming blocking beads according to the first embodiment of the present disclosure.

FIG. 6 is a view of the step of forming blocking beads. FIG. 7 is a flowchart of the step of forming blocking beads.

As shown in FIG. 6, in the step S21A of forming blocking beads, blocking beads 101A and 101B are formed as the weld beads 100 on both sides of the target surface Mf in the width direction Dw. As shown in FIG. 7, the step S21A of forming blocking beads includes a first preparation step S211, an outer periphery-side blocking bead formation step S212, a first nozzle movement step S213, and an inner periphery-side blocking bead formation step S214.

In the first preparation step S211, the tilt control portion 72 controls the table tilting portion 4, thereby tilting the table 2 such that the central axis 2c of the table has a predetermined first inclination angle θ1 with respect to the vertical direction Dv as shown in FIG. 6. The first inclination angle θ1 is an angle at which, for example, an extension direction De of the tubular portion 11 of the modeled article 10 that is to be formed on the table upper surface 2f of the table 2 coincides with the vertical direction Dv. Here, the extension direction De of the tubular portion 11 that is aligned with the vertical direction Dv is the extension direction De of the tubular portion 11 at a position at which the weld beads 100 are formed in the peripheral direction around the central axis 2c (in other words, a position facing the welding nozzle 5). Furthermore, in other words, the extension direction De that is aligned with the vertical direction Dv is the extension direction De of the tubular portion 11 on the left side in the cross section shown in FIG. 6. The extension direction De of the tubular portion 11 in the present embodiment is a direction that obliquely extends upward from the table upper surface 2f of the table 2 such that the tubular portion gradually approaches the central axis 2c.

In the first preparation step S211, the nozzle operation control portion 73 controls the multiaxial arm (not shown), thereby moving the welding nozzle 5. The welding nozzle 5 is disposed at a position that faces the end portion of the target surface Mf on a first side in the width direction Dw (on the outside in the radial direction Dr of the tubular portion 11 to be formed). In the first preparation step S211, the welding control portion 74 sets the welding current, which is to be supplied to the welding nozzle 5 in the current supply portion 51, to the first welding current value AL, which is lower than the second welding current value AH. In the first preparation step S211, the rotation control portion 71 controls the table rotary-driving portion 3, thereby rotating the table 2 around the central axis 2c at a predetermined rotation speed.

In the outer periphery-side blocking bead formation step S212, the welding current set to the first welding current value AL is supplied to the welding nozzle 5 from the current supply portion 51, and arc welding is carried out. Therefore, on the target surface Mf, the outer periphery-side blocking beads 101A, which are continuous in the peripheral direction in an annular shape around the central axis 2c, are formed on the end portion on the first side in the width direction Dw (for example, on the outside in the radial direction Dr of the tubular portion 11).

In the first nozzle movement step S213, the nozzle operation control portion 73 controls the multiaxial arm (not shown), thereby moving the welding nozzle 5. The welding nozzle 5 is disposed at a position that faces the end portion of the target surface Mf on a second side in the width direction Dw (on the inside in the radial direction Dr of the tubular portion 11).

In the inner periphery-side blocking bead formation step S214, the welding current set to the first welding current value AL is supplied to the welding nozzle 5 from the current supply portion 51, and arc welding is carried out. Therefore, on the target surface Mf, the inner periphery-side blocking beads 101B, which are continuous in the peripheral direction in an annular shape around the central axis 2c, are formed on the end portion on the second side in the width direction Dw (on the inside in the radial direction Dr of the tubular portion 11).

(Step of Forming Inner Beads)

Figure 8:
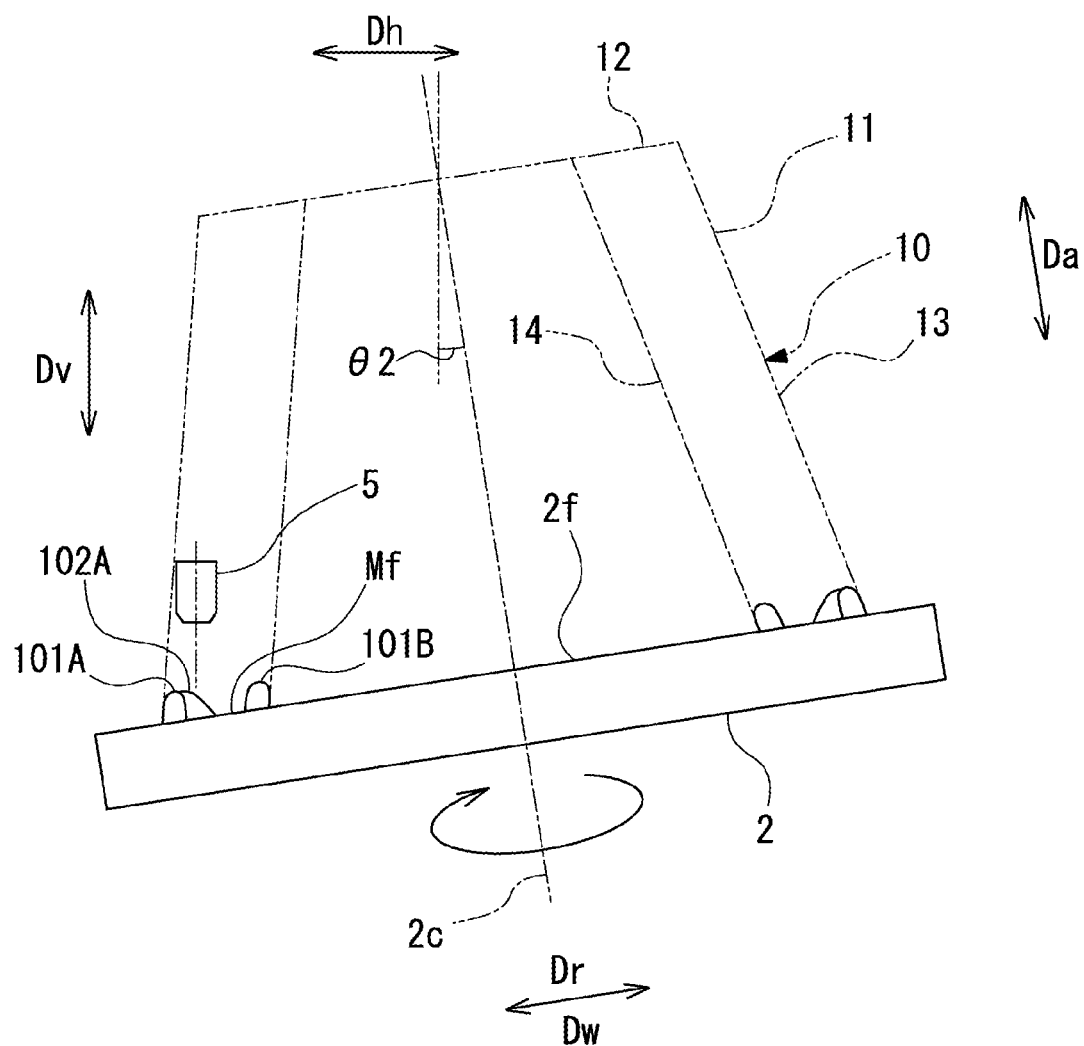
FIG. 8 is a view of a step of forming inner beads according to the first embodiment of the present disclosure.
Figure 9:
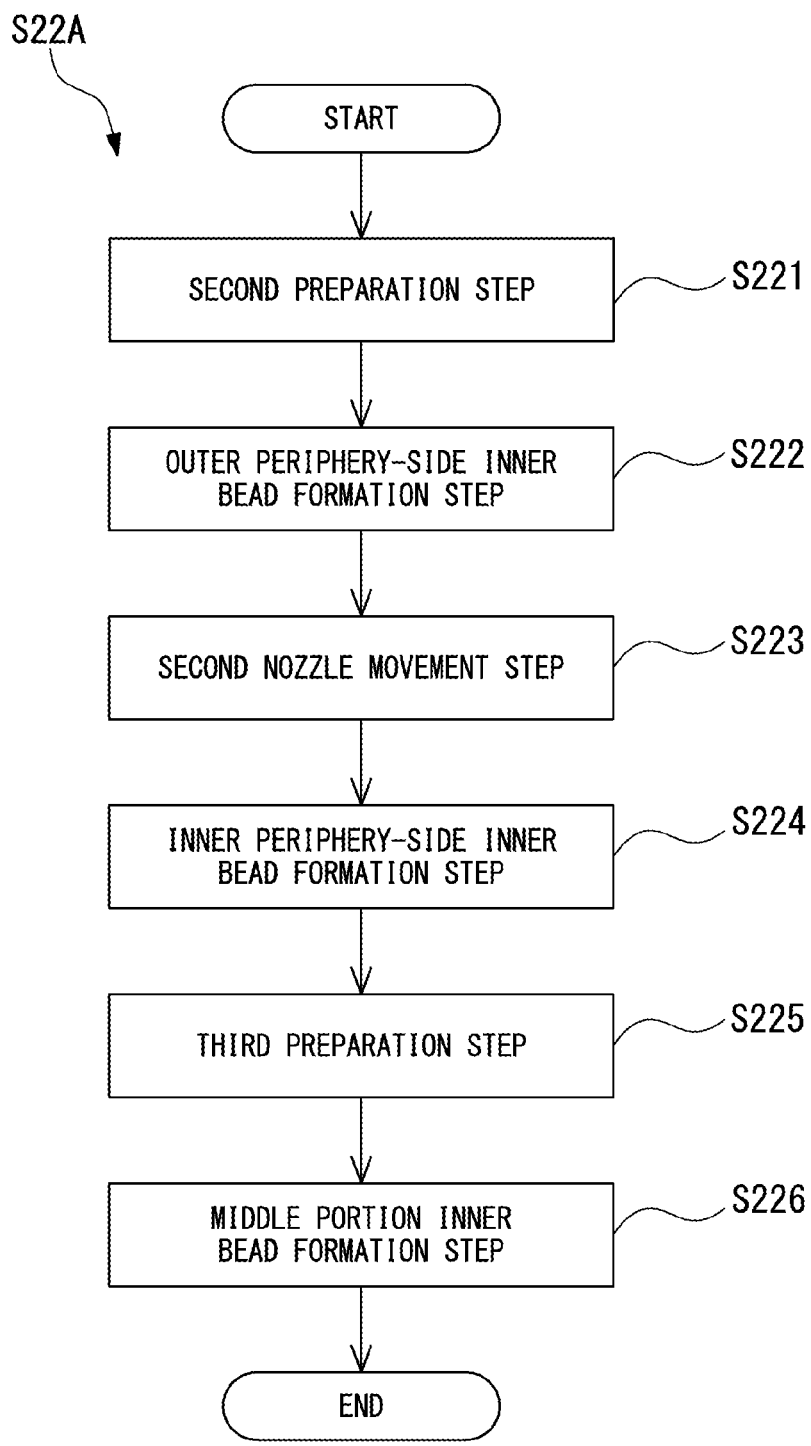
FIG. 9 is a flowchart of the step of forming inner beads according to the first embodiment of the present disclosure.

FIG. 8 is a view of the step of forming inner beads. FIG. 9 is a flowchart of the step of forming inner beads. As shown in FIG. 5, the step S22A of forming inner beads is carried out after the step S21A of forming blocking beads.

In the step S22A of forming inner beads, inner beads 102A (refer to FIG. 8), inner beads 102B (refer to FIG. 10), and inner beads 102C (refer to FIG. 11) are formed as the weld beads 100 so as to fill the space on the inside of the blocking beads 101A and 101B in the width direction Dw of the target surface Mf.

As shown in FIG. 9, the step S22A of forming inner beads includes a second preparation step S221, an outer periphery-side inner bead formation step S222, a second nozzle movement step S223, and an inner periphery-side inner bead formation step S224, a third preparation step S225, and a middle portion inner bead formation step S226.

In the second preparation step S221, the tilt control portion 72 controls the table tilting portion 4, thereby tilting the table 2 such that the central axis 2c of the table has a predetermined second inclination angle θ2 with respect to the vertical direction Dv as shown in FIG. 8. The second inclination angle θ2 is smaller than the first inclination angle θ1. In the second preparation step S221, the nozzle operation control portion 73 controls the multiaxial arm (not shown), thereby moving the welding nozzle 5. The welding nozzle 5 is disposed at a position that faces the boundary portion between the outer periphery-side blocking bead 101A and the target surface Mf that is on the inside of the blocking bead 101A in the width direction Dw on the target surface Mf. In the second preparation step S221, the welding control portion 74 sets the welding current, which is to be supplied to the welding nozzle 5 in the current supply portion 51, to the second welding current value AH, which is higher than the first welding current value AL.

In the outer periphery-side inner bead formation step S222, the welding current set to the second welding current value AH is supplied to the welding nozzle 5 from the current supply portion 51, and arc welding is carried out. Therefore, on the target surface Mf, the outer periphery-side inner beads 102A, which are continuous in the peripheral direction in an annular shape around the central axis 2c, are formed on the inside in the width direction Dw (on the inside in the radial direction Dr) of the outer periphery-side blocking bead 101A.

Figure 10:
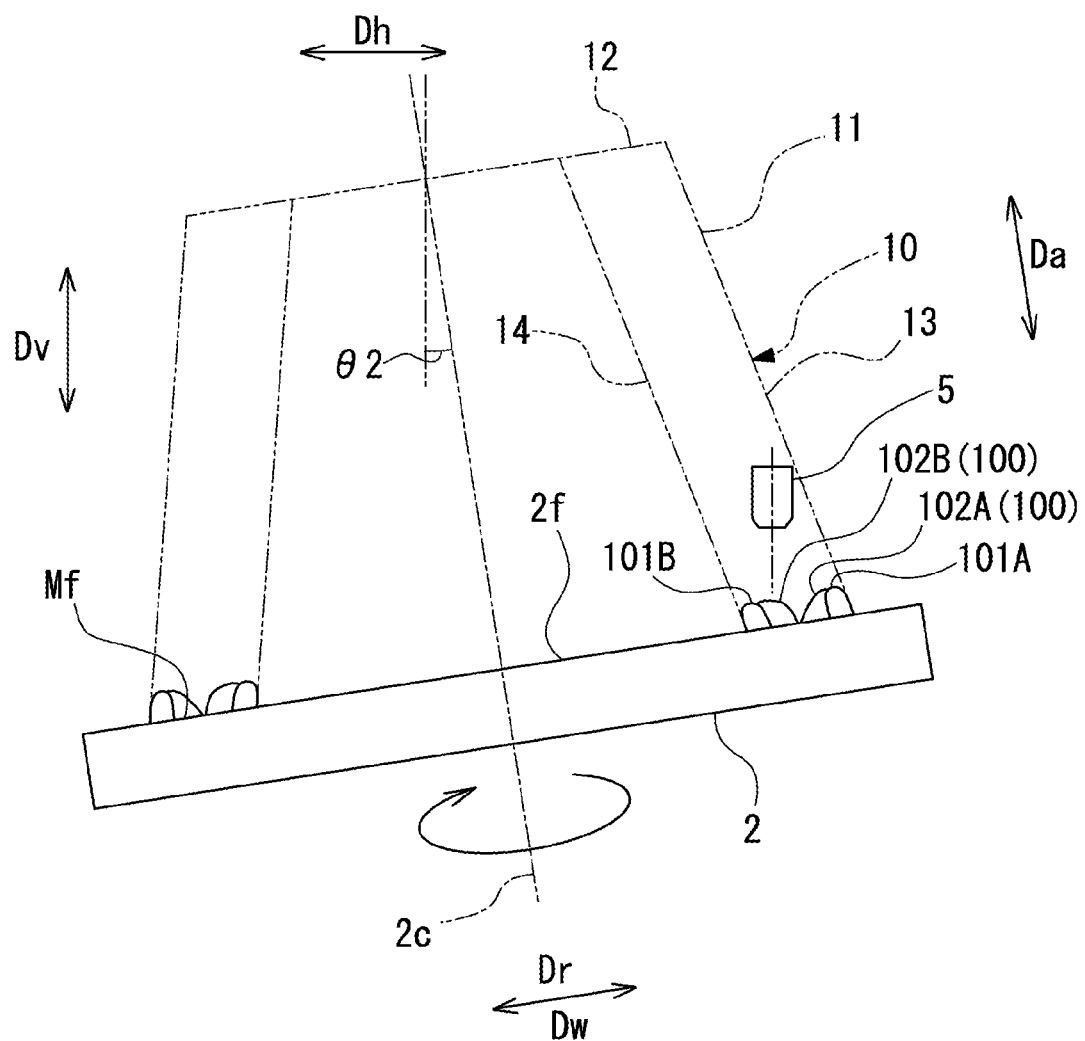
FIG. 10 is a view of an inner periphery-side inner bead formation step according to the first embodiment of the present disclosure.

FIG. 10 is a view of the inner periphery-side inner bead formation step.

In the second nozzle movement step S223, the nozzle operation control portion 73 controls the multiaxial arm (not shown), thereby moving the welding nozzle 5 and disposing the welding nozzle 5 on the target surface Mf at a position that faces the boundary portion between the inner periphery-side blocking bead 101B and the target surface Mf that is on the outside of the blocking bead 101B in the radial direction as shown in FIG. 10.

In the inner periphery-side inner bead formation step S224, the welding current set to the second welding current value AH is supplied to the welding nozzle 5 from the current supply portion 51, and arc welding is carried out. Therefore, on the target surface Mf, the inner periphery-side inner beads 102B, which are continuous in the peripheral direction in an annular shape around the central axis 2c, are formed on the inside in the width direction Dw (on the outside in the radial direction Dr) of the inner periphery-side blocking bead 101B.

Figure 11:
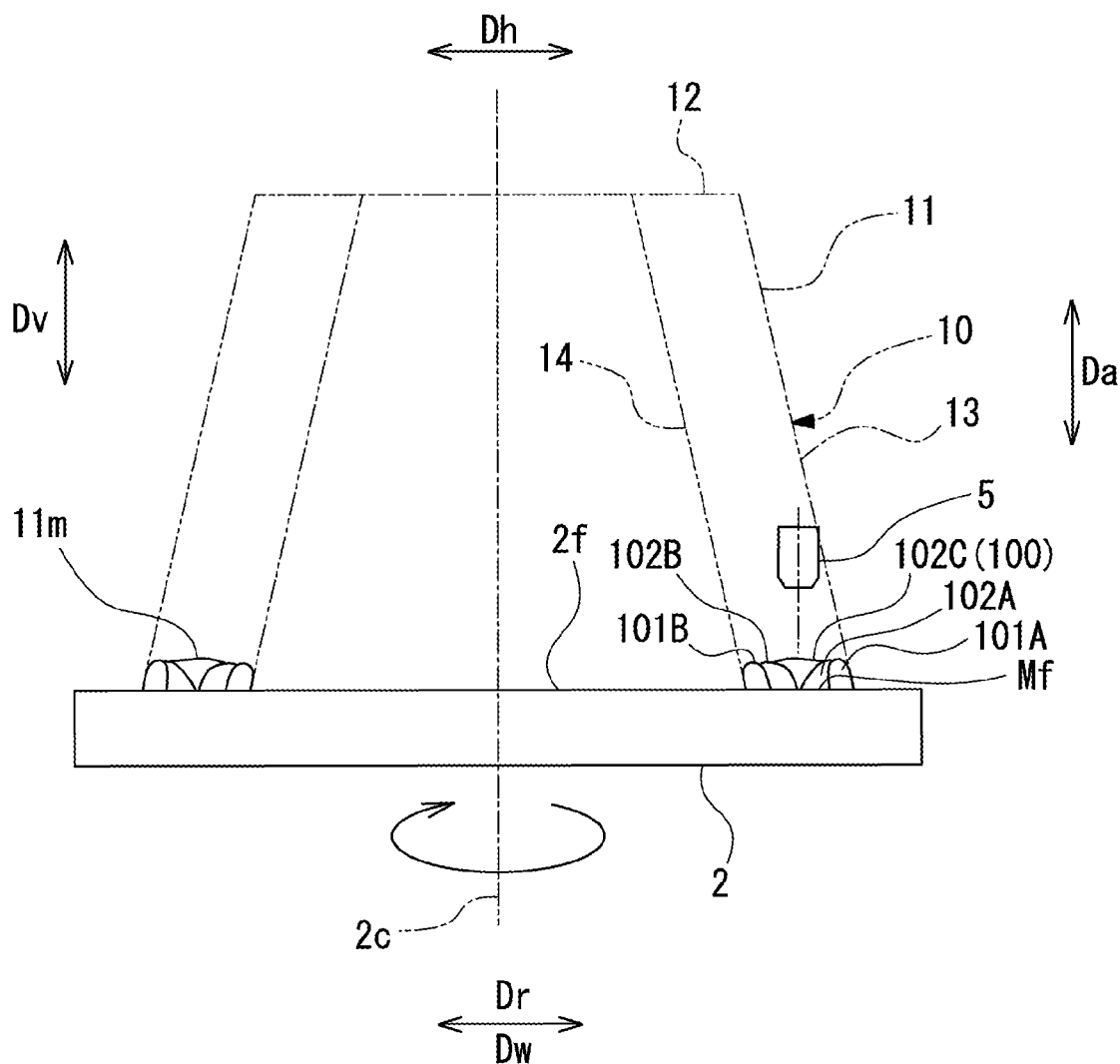
FIG. 11 is a view of a middle portion inner bead formation step according to the first embodiment of the present disclosure.

FIG. 11 is a view of the middle portion inner bead formation step.

In the third preparation step S225, the tilt control portion 72 controls the table tilting portion 4, thereby tilting the table 2 such that the central axis 2c of the table coincides with the vertical direction Dv as shown in FIG. 11. Therefore, the target surface Mf is directed upward in the vertical direction Dv. In the third preparation step S225, the nozzle operation control portion 73 controls the multiaxial arm (not shown), thereby moving the welding nozzle 5. The welding nozzle 5 is disposed at a position that faces the middle portion between the outer periphery-side inner bead 102A and the inner periphery-side inner bead 102B on the target surface Mf.

In the middle portion inner bead formation step S226, the welding current set to the second welding current value AH is supplied to the welding nozzle 5 from the current supply portion 51, and arc welding is carried out. Therefore, on the target surface Mf, the inner beads 102C in the middle portion, which are continuous in the peripheral direction in an annular shape around the central axis 2c, are formed between the outer periphery-side inner beads 102A and the inner periphery-side inner beads 102B. The inner bead 102C in the middle portion is formed so as to overlap both the outer periphery-side inner bead 102A and the inner periphery-side inner bead 102B. In addition, in a case where the length of the target surface Mf in the width direction Dw is large, the inner beads 102C in the middle portion may be formed in a plurality of rows in the width direction Dw between the outer periphery-side inner bead 102A and the inner periphery-side inner bead 102B by repeating the third preparation step S225 and the middle portion inner bead formation step S226 a plurality of times.

The metal layer 11m including the blocking beads 101A and 101B on both sides in the width direction Dw and the inner beads 102A, 102B, and 102C that fill the space on the inside of the blocking beads 101A and 101B in the width direction Dw of the target surface Mf on the target surface Mf is formed in the above-described manner.

(Step of Moving Nozzle)

As shown in FIG. 5, the step S23 of moving the nozzle is carried out after the step S22A of forming inner beads. In the step S23 of moving the nozzle, the welding nozzle 5 is moved in the axial direction Da by a length corresponding to the thickness of one metal layer 11m so as to move away from the table 2.

Figure 12:
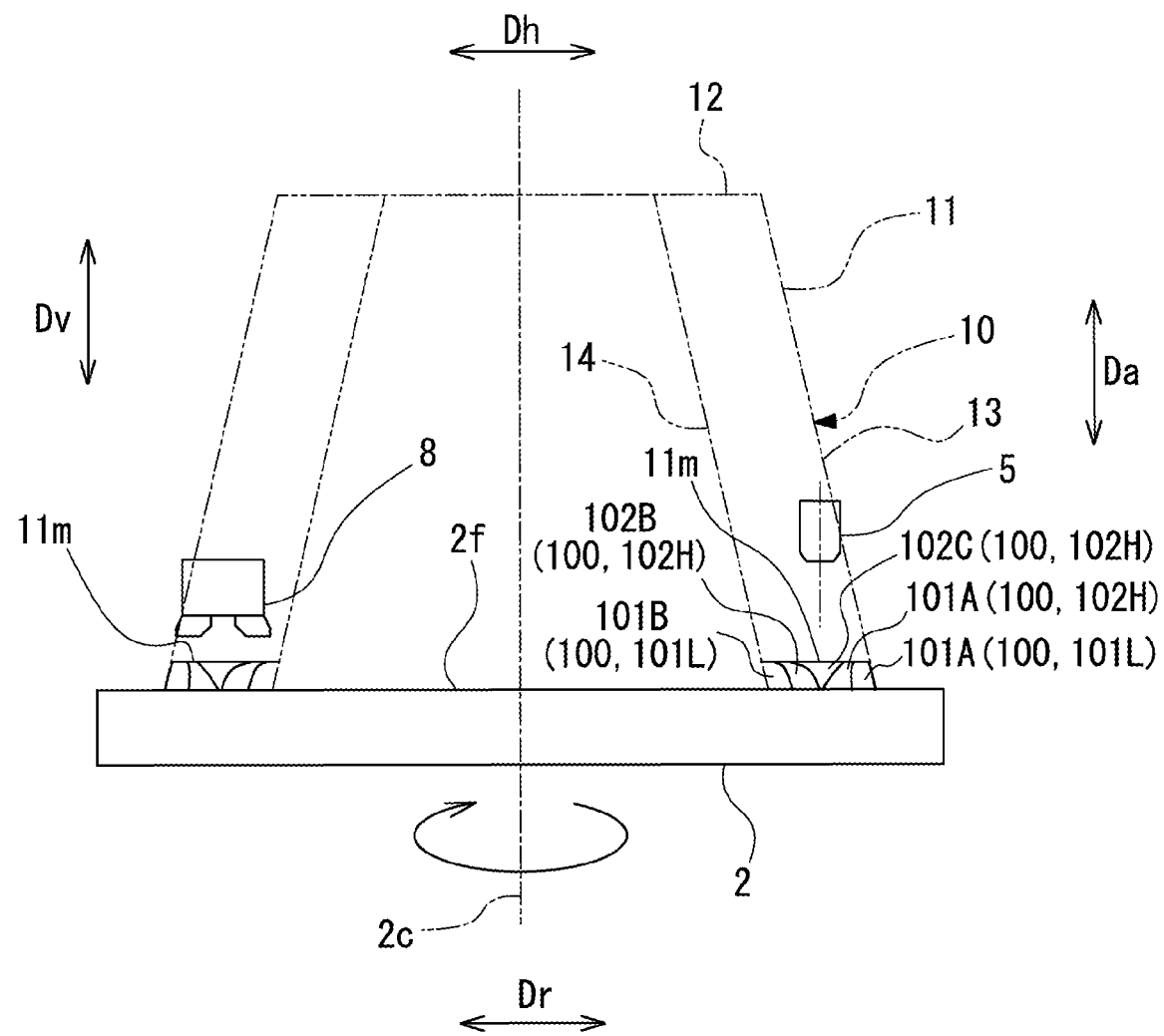
FIG. 12 is a view of a step of cutting and levelling an upper surface according to the first embodiment of the present disclosure.

FIG. 12 is a view of the step of cutting and levelling an upper surface. As shown in FIG. 12, in the step S24 of cutting and levelling an upper surface, the upper surface of the metal layer 11m that has formed one layer is cut with a cutting tool 8 and levelled so as to be made almost a flat surface. The step S24 of cutting and levelling an upper surface is carried out after the step S21A of forming blocking beads and the step S22A of forming inner beads are repeated a plurality of times, but the upper surface of a plurality of the metal layers 11m laminated may be cut with the cutting tool 8. In addition, it is also possible to omit the step S24 of cutting and levelling an upper surface.

(Step of Confirming Final Number of Laminated Layers)

As shown in FIG. 5, the step S25 of confirming the final number of laminated layers is carried out after the step S24 of cutting and levelling an upper surface. In the step S25 of confirming the final number of laminated layers, whether or not the number of the metal layers 11m laminated reaches a preset final number of layers is confirmed. In the confirmation, the controller 6 determines, for example, whether or not the number of the metal layers 11m laminated reaches the preset final number of layers. As a result, when the number of the metal layers 11m laminated after the beginning of the process does not reach the final number of layers, the process returns to the step S21A of forming blocking beads, and the formation of another metal layer 11m begins. In addition, in step S25 of confirming the final number of laminated layers, in a case where the number of the metal layers 11m laminated reaches the final number of layers, the process proceeds to the step S3 of forming a side surface.

(Step of Forming Side Surface)

Figure 13:
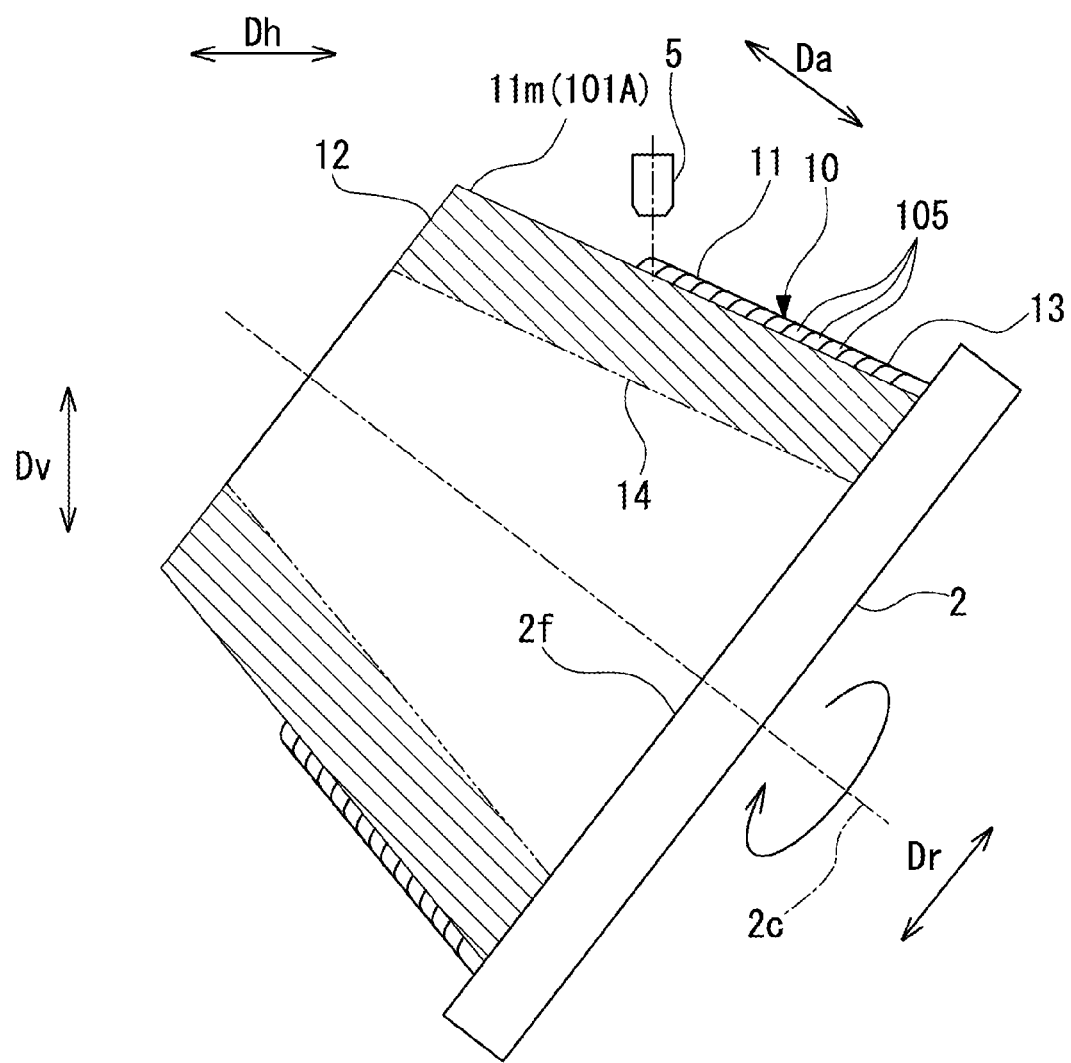
FIG. 13 is a view of a step of forming a side surface according to the first embodiment of the present disclosure.

FIG. 13 is a view of the step of forming a side surface.

As shown in FIG. 4, the step S3 of forming a side surface is carried out after the step S2A of laminating a metal layer is carried out a plurality of times. In the step S3 of forming a side surface of the present embodiment, the tilt control portion 72 controls the table tilting portion 4, thereby tilting the table 2 such that the outer periphery-side blocking bead 101A of each metal layer 11m is disposed upward in the vertical direction Dv as shown in FIG. 13.

In the step S3 of forming a side surface, side surface weld beads 105 are formed so as to be stacked on the plurality of blocking beads 101A positioned on the outer peripheral side of the plurality of metal layers 11m laminated in the axial direction Da. The side surface weld beads 105 are continuously formed in the peripheral direction in a ring shape by rotating the table 2. The side surface weld beads 105 are formed in a plurality of rows while moving the welding nozzle 5 in the axial direction Da. Therefore, the plurality of side surface weld beads 105 are formed side by side in the axial direction Da with no gap therebetween. As a result, the entire outer peripheral surface 13 of the tubular portion 11 is formed of the side surface weld beads 105. The modeled article 10 having a predetermined shape is formed on the table 2 in the above-described manner.

(Step of Removing Modeled Article)

As shown in FIG. 4, the step S4 of removing a modeled article is carried out after the step S3 of forming a side surface. In the step S4 of removing a modeled article, the modeled article 10 formed on the table 2 is separated and removed from the table 2. This removal ends the modeling of the modeled article 10.

In the modeled article 10 formed as described above, the plurality of rows of weld beads 100 is disposed side by side in the width direction Dw in each layer of the metal layers 11m (refer to FIG. 12). The plurality of rows of weld beads 100 that forms each layer of the metal layers 11m includes the blocking beads 101A and 101B that are disposed outside in the width direction Dw and form the outer shape of the metal layer 11m and the inner beads 102A, 102B, and 102C disposed on the inside of the blocking beads 101A and 101B in the width direction Dw. The blocking beads 101A, 101B are low-current solidified beads 101L that are formed by arc welding carried out at the first welding current value AL, which is lower than the second welding current value AH used at the time of forming the inner beads 102A, 102B, and 102C. In addition, the inner beads 102A, 102B, and 102C are high-current solidified beads 102H that are formed by arc welding carried out at the second welding current value AL, which is higher than the first welding current value AH used at the time of forming the blocking beads 101A and 101B.

In addition, regarding the bead cross-sectional area seen in the peripheral direction around the central axis 2c, the inner beads 102A, 102B, and 102C have a larger bead cross-sectional area than the blocking beads 101A and 101B.

(Action and Effect)

In the metal laminating and modeling method S1A of the first embodiment, the step S2A of laminating a metal layer includes the step S21A of forming blocking beads, by which the blocking beads 101A and 101B are formed on the end portions of the target surface Mf in the width direction Dw, and the step S22A of forming inner beads, by which the inner beads 102A, 102B, 102C, and 102C are formed by arc welding with a current higher than the current in the step S21A of forming blocking beads so as to fill the space on the inside of the blocking beads 101A and 101B in the width direction Dw of the target surface Mf.

Therefore, according to the metal laminating and modeling method S1A of the first embodiment, at the time of forming the inner beads 102A, 102B, 102C, and 102C, molten metal is blocked by the blocking beads 101A, 101B formed on the target surface Mf along the outer peripheral shape of the modeled article 10. This configuration prevents the molten metal that forms the inner beads 102A, 102B, and 102C from dropping on the outside of the target surface Mf. In addition, at the time of forming the blocking beads 101A and 101B, arc welding with a current lower than the current for the inner beads 102A, 102B, and 102C is used. Therefore, molten metal that forms the blocking beads 101A and 101B is less likely to flow than the inner beads 102A, 102B, and 102C, and it is possible to favorably form the blocking beads 101A and 101B while preventing the drop of the molten metal that forms the blocking beads 101A and 101B on the outside of the target surface Mf. Furthermore, the inner beads 102A, 102B, and 102C are formed by arc welding with a current higher than the current for the blocking beads 101A and 101B. Therefore, it becomes possible to efficiently form the inner beads 102A, 102B, and 102C. Therefore, it becomes possible to prevent the molten metal from dropping on the outside of the target surface Mf and to model the modeled article 10 having a favorable quality at a high speed.

In addition, in the metal laminating and modeling method S1A of the first embodiment, the blocking beads 101A and 101B are formed on both end portions of the target surface Mf in the width direction Dw in the step S21A of forming blocking beads, and the inner beads 102A, 102B, and 102C are formed so as to fill the space between the blocking beads 101A and 101B on both sides of the target surface Mf in the width direction Dw in the step S22A of forming inner beads, by which the inner beads 102A, 102B, and 102C are formed. Therefore, according to the metal laminating and modeling method S1A of the first embodiment, since the blocking beads 101A and 101B have been formed on both sides of the target surface Mf in the width direction Dw at the time of forming the inner beads 102A, 102B, and 102C, the drop of the molten metal that forms the inner beads 102A, 102B, and 102C on the outside of the target surface Mf is more effectively prevented.

In addition, the metal laminating and modeling method S1A of the first embodiment further includes the step S24 of cutting and levelling an upper surface.

Therefore, according to the metal laminating and modeling method S1A of the first embodiment, after the metal layer 11m is laminated, the upper surface of the metal layer 11m is cut and levelled, thereby preventing the generation of a gap between the blocking beads 101A and 101B and the inner beads 102A, 102B, and 102C in the metal layer 11m that is to be formed on the upper tier side and the upper surface of the metal layer 11m on the lower tier side.

In addition, in the metal laminating and modeling method S1A of the first embodiment, the table 2 and the welding nozzle 5 are relatively rotated around the central axis 2c, thereby laminating the metal layers 11m on the table 2.

Therefore, according to the metal laminating and modeling method S1A of the first embodiment, it is possible to easily form the tubular modeled article 10 on the table 2 by laminating the metal layers 11m while relatively rotating the table 2 and the welding nozzle 5 around the central axis 2c of the table 2.

In each layer of the metal layers 11m in the modeled article 10 of the first embodiment, the plurality of rows of weld beads 100 is disposed side by side in the width direction Dw. In addition, the plurality of rows of weld beads 100 includes the blocking beads 101A and 101B that are disposed outside in the width direction Dw and form the outer shape of the metal layer 11m and the inner beads 102A, 102B, and 102C disposed on the inside of the blocking beads 101A and 101B in the width direction Dw. Furthermore, the inner beads 102A, 102B, and 102C are the high-current solidified beads 102H formed by arc welding with a current higher than the current for the blocking beads 101A, 101B.

Therefore, in the modeled article 10 of the first embodiment, in each layer of the metal layers 11m, the inner beads 102A, 102B, and 102C in the width direction Dw are the high-current solidified beads 102H, and the blocking beads 101A and 101B in the width direction Dw are the low-current solidified beads 101L. Therefore, it becomes possible to prevent the molten metal from dropping on the outside of the target surface Mf and to efficiently form a modeled article having a favorable quality.

In addition, regarding the bead cross-sectional area in the modeled article 10, the inner beads 102A, 102B, and 102C have a larger bead cross-sectional area than the blocking beads 101A and 101B.

Therefore, since it is possible to arc-weld the blocking beads 101A and 101B with a low current and to arc-weld the inner beads 102A, 102B, and 102C with a high current, it is possible to efficiently form the modeled article 10 compared with a case where all weld beads are arc-welded with a low current.

Second Embodiment

Next, a second embodiment of the present disclosure will be described. In the second embodiment described below, since only the configurations of the step of forming blocking beads and the step of forming inner beads are different from those in the first embodiment, FIG. 4 and FIG. 5 are incorporated herein, and, in the following description, the same portion as in the first embodiment will be given the same reference numeral and will not be described again.

(Order of Treatments in Metal Laminating and Modeling Method)

Next, a metal laminating and modeling method S1B that is carried out using the modeling system 1 will be described. As shown in FIG. 4, the metal laminating and modeling method S1B of the present embodiment includes a step S2B of laminating a metal layer, the step S3 of forming a side surface, and the step S4 of removing a modeled article.

(Metal Layer Lamination Step)

As shown in FIG. 5, the step S2B of laminating a metal layer of the present embodiment includes a step S21B of forming blocking beads, a step S22B of forming inner beads, the step S23 of moving the nozzle, the step S24 of cutting and levelling an upper surface, and the step S25 of confirming the final number of laminated layers.

(Step of Forming Blocking Beads)

Figure 14:
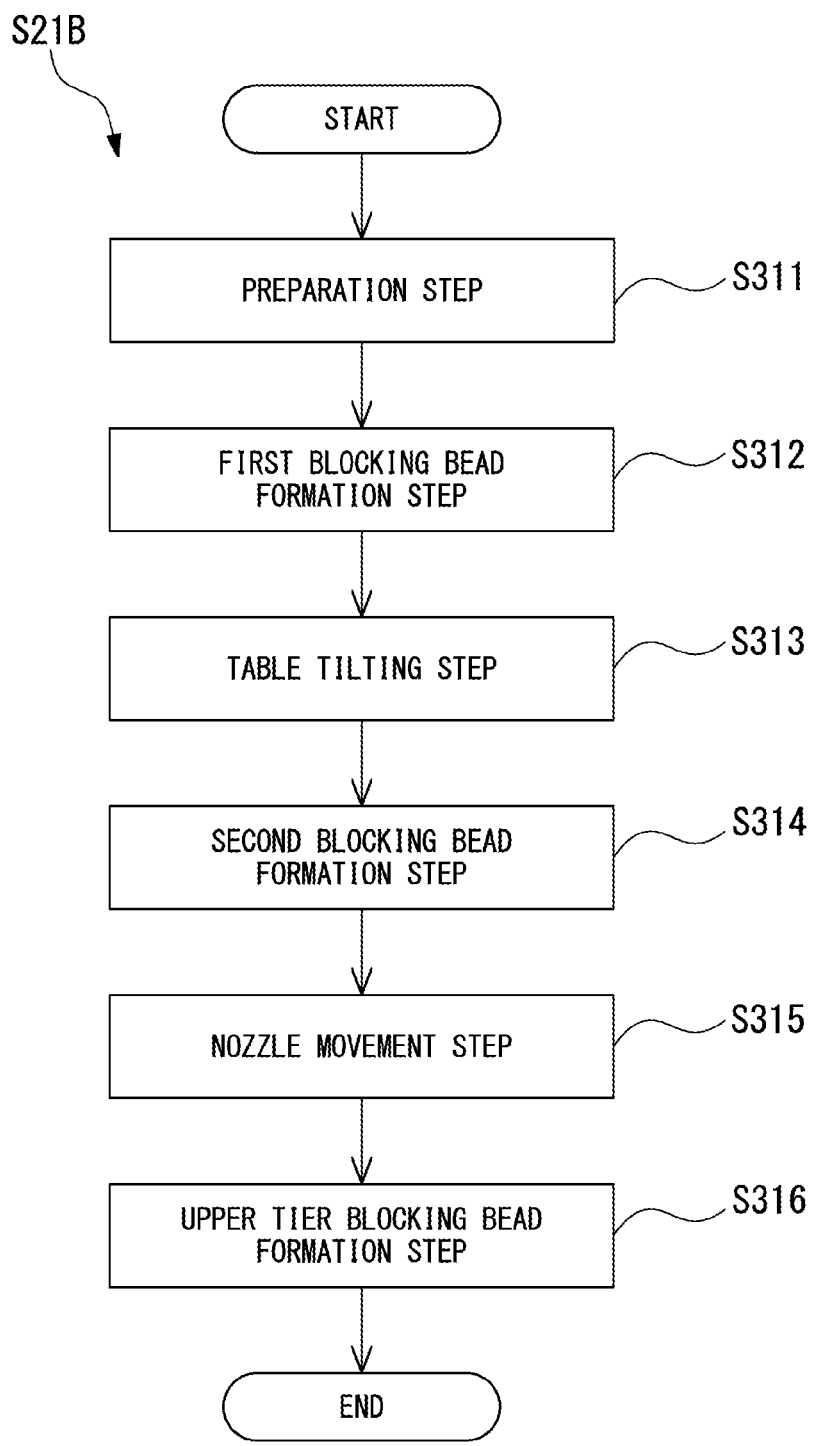
FIG. 14 is a flowchart of a step of forming blocking beads according to a second embodiment of the present disclosure.

FIG. 14 is a flowchart of the step of forming blocking beads according to the second embodiment.

As shown in FIG. 14, the step S21B of forming blocking beads includes a preparation step S311, a first blocking bead formation step S312, a table tilting step S313, and a second blocking bead formation step S314, a nozzle movement step S315, and an upper tier blocking bead formation step S316.

Figure 15:
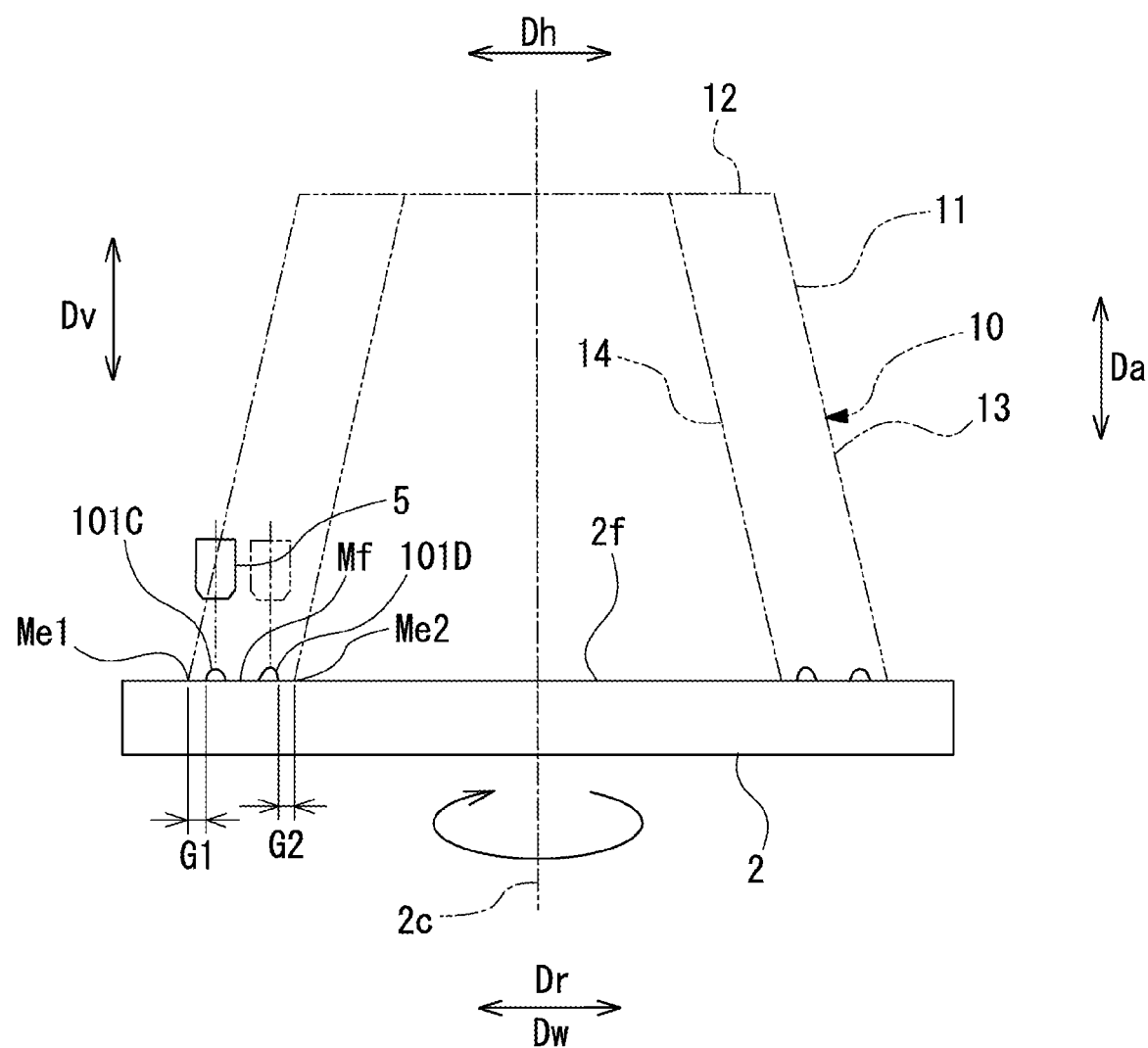
FIG. 15 is a view of a first blocking bead formation step according to the embodiment of the present disclosure.

FIG. 15 is a view of the first blocking bead formation step.

In the preparation step S311, the tilt control portion 72 controls the table tilting portion 4, thereby aligning the central axis 2c of the table 2 with the vertical direction Dv as shown in FIG. 15. Therefore, the table upper surface 2*f* is disposed to face upward in the vertical direction Dv. In the preparation step S311, the nozzle operation control portion 73 controls the multiaxial arm (not shown), thereby moving the welding nozzle 5. The welding nozzle 5 is disposed so as to face a position a gap G1 of a predetermined dimension apart inward in the width direction Dw from an edge portion Me1 on a first side (on the outside of the tubular portion 11 in the radial direction Dr) in the width direction Dw on the target surface Mf. In the preparation step S311, the welding control portion 74 sets the welding current, which is to be supplied to the welding nozzle 5 in the current supply portion 51, to the first welding current value AL, which is lower than the second welding current value AH. In the preparation step S311, the rotation control portion 71 controls the table rotary-driving portion 3, thereby rotating the table 2 around the central axis 2*c* at a predetermined rotation speed.

In the first blocking bead formation step S312, the welding current set to the first welding current value AL is supplied to the welding nozzle 5 from the current supply portion 51, and arc welding is carried out. Therefore, on the target surface Mf, first outer periphery-side blocking beads 101C, which are continuous in the peripheral direction in an annular shape around the central axis 2*c*, are formed at the position the gap G1 of a predetermined length apart inward in the width direction Dw from the edge portion Me1 on the first side (on the outside of the tubular portion 11 in the radial direction Dr) in the width direction Dw. At the time of forming the first blocking beads 101C, since there is the gap G1 extending up to the edge portion Me1 on the outside of the target surface Mf in the width direction Dw, molten metal that forms the first blocking beads 101C is prevented from dropping on the outside of the target surface Mf.

In the first blocking bead formation step S312, next, the nozzle operation control portion 73 controls the multiaxial arm (not shown), thereby moving the welding nozzle 5. The welding nozzle 5 is disposed so as to face a position a gap G2 of a predetermined length apart inward in the width direction Dw (toward the outside of the tubular portion 11 in the radial direction) from an edge portion Me2 on a second side (on the inside of the tubular portion 11 in the radial direction Dr) in the width direction Dw on the target surface Mf. In the first blocking bead formation step S312, subsequently, the welding current set to the first welding current value AL is supplied to the welding nozzle 5 from the current supply portion 51, and arc welding is carried out. Therefore, first inner periphery-side blocking beads 101D, which are continuous in the peripheral direction in an annular shape around the central axis 2*c*, are formed at the position the gap G2 of a predetermined length apart inward in the width direction Dw from the edge portion Me2 of the target surface Mf. At the time of forming the first blocking beads 101D, since there is the gap G2 extending up to the edge portion Me2 on the outside of the target surface Mf in the width direction Dw, molten metal that forms the first blocking beads 101D is prevented from dropping on the outside of the target surface Mf.

Figure 16:
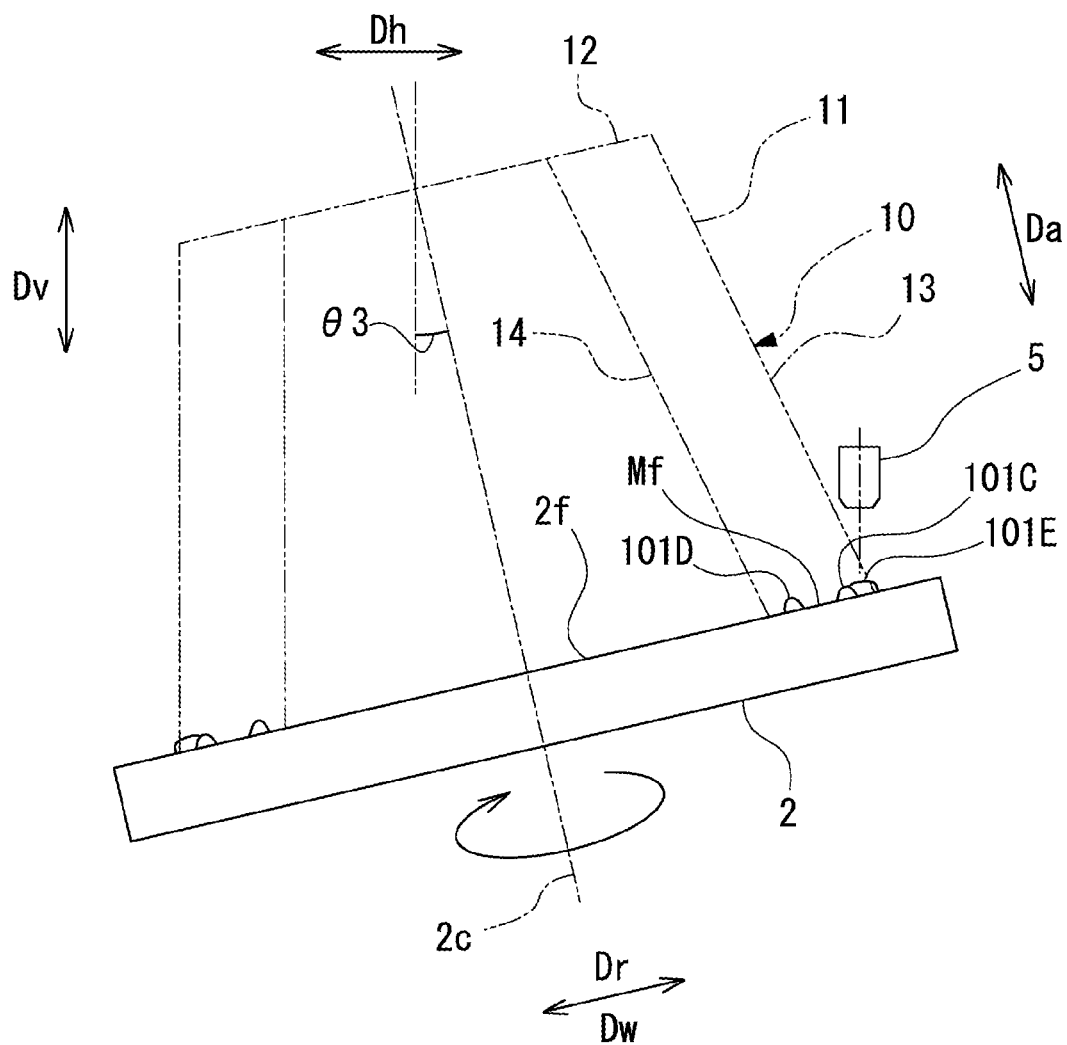
FIG. 16 is a view of a second blocking bead formation step according to the embodiment of the present disclosure.

FIG. 16 is a view of the second blocking bead formation step.

In the table tilting step S313, the tilt control portion 72 controls the table tilting portion 4, thereby tilting the table 2 such that the central axis 2*c* of the table has a predetermined third inclination angle θ3 with respect to the vertical direction Dv as shown in FIG. 16. Here, the third inclination angle θ3 is preferably set to, for example, 20° to 40°. Therefore, the target surface Mf is put into a state of being inclined in the width direction Dw.

In the second blocking bead formation step S314, the nozzle operation control portion 73 controls the multiaxial arm (not shown), thereby moving the welding nozzle 5. The welding nozzle 5 is disposed on the target surface Mf at a position adjacent to the outside of the first outer periphery-side blocking bead 101C in the width direction Dw on a side of the central axis 2*c* on which the height in the vertical direction Dv is higher (the right side in FIG. 16).

In the second blocking bead formation step S314, furthermore, the welding current set to the first welding current value AL is supplied to the welding nozzle 5 from the current supply portion 51, and arc welding is carried out. Therefore, on the target surface Mf, the second outer periphery-side blocking beads 101E, which are continuous in the peripheral direction in an annular shape around the central axis 2*c*, are formed adjacent to the first outer periphery-side blocking beads 101C on the outside in the width direction Dw. At the time of forming the second outer periphery-side blocking beads 101E, the target surface Mf is obliquely inclined downward from the outside in the width direction Dw toward the inside in the width direction Dw. Therefore, molten metal that forms the second outer periphery-side blocking beads 101E is blocked by the first blocking beads 101C that are positioned on the inside of the target surface Mf in the width direction Dw.

Figure 17:
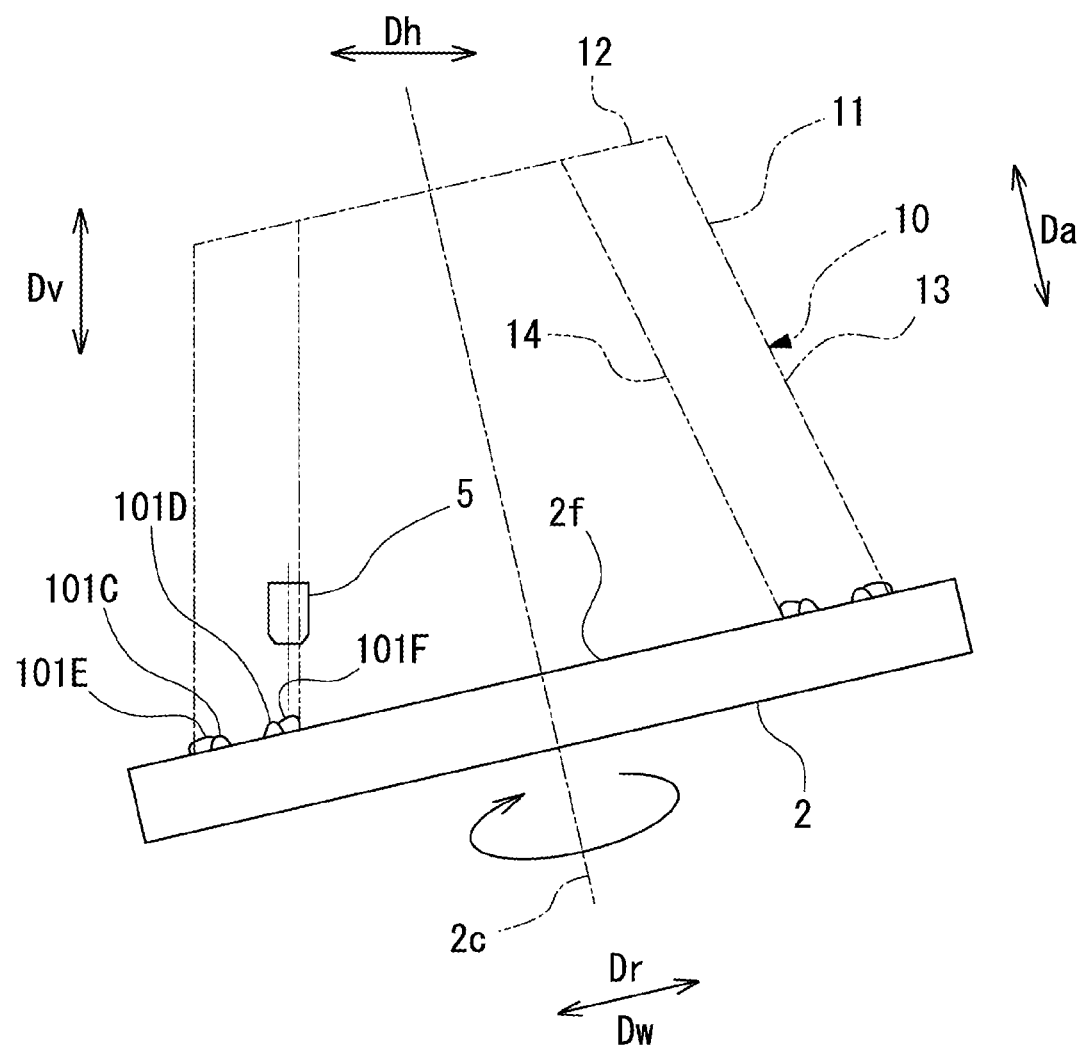
FIG. 17 is a view of a state subsequent to FIG. 16 in the second blocking bead formation step according to the embodiment of the present disclosure.

FIG. 17 is a view of a state subsequent to FIG. 16 in the second blocking bead formation step.

In the second blocking bead formation step S314, next, the nozzle operation control portion 73 controls the multiaxial arm (not shown), thereby moving the welding nozzle 5 as shown in FIG. 17. The welding nozzle 5 is disposed on the target surface Mf at a position adjacent to the outside of the first inner periphery-side blocking bead 101D in the width direction Dw (the inside of the tubular portion 11 in the radial direction Dr) on a side of the central axis 2*c* on which the height in the vertical direction Dv is lower (the left side in FIG. 17).

In the second blocking bead formation step S314, furthermore, the welding current set to the first welding current value AL is supplied to the welding nozzle 5 from the current supply portion 51, and arc welding is carried out. Therefore, on the target surface Mf, the second inner periphery-side blocking beads 101F, which are continuous in the peripheral direction in an annular shape around the central axis 2*c*, are formed adjacent to the first inner periphery-side blocking beads 101D on the outside in the width direction Dw (on the inside of the tubular portion 11 in the radial direction Dr). At the time of forming the second inner periphery-side blocking beads 101F, the target surface Mf is obliquely inclined downward from the outside in the width direction Dw toward the inside in the width direction Dw. Therefore, molten metal that forms the second inner periphery-side blocking beads 101F is blocked by the first inner periphery-side blocking beads 101D that are positioned on the inside of the target surface Mf in the width direction Dw.

With the first blocking bead formation step S312 and the second blocking bead formation step S314, the first blocking beads 101C and the second blocking beads 101E are formed on the outer peripheral side of the target surface Mf side by side in the width direction Dw in a plurality of rows (two rows). In addition, the first blocking beads 101D and the second blocking beads 101F are formed on the inner peripheral side of the target surface Mf side by side in the width direction Dw in a plurality of rows (two rows).

In the nozzle movement step S315, the nozzle operation control portion 73 controls the multiaxial arm (not shown), thereby moving the welding nozzle 5 in the vertical direction Dv. The welding nozzle 5 is moved by a length corresponding to the thickness of one layer of the first blocking beads 101C and 101D and the second blocking beads 101E and 101F so as to move away from the table 2.

(Upper Tier Blocking Bead Formation Step)

Figure 18:
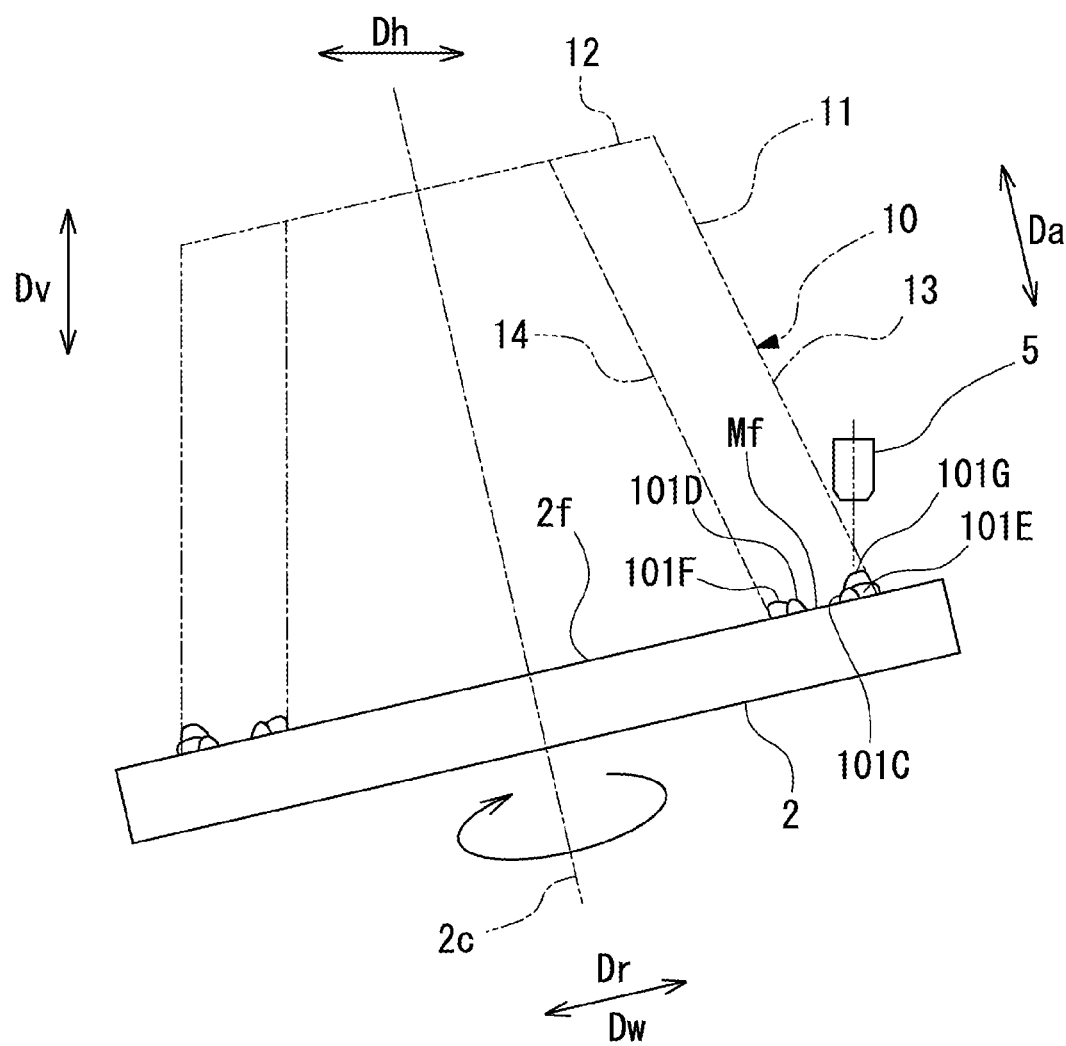
FIG. 18 is a view of an upper tier blocking bead formation step according to the embodiment of the present disclosure.

FIG. 18 is a view of the upper tier blocking bead formation step.

In the upper tier blocking bead formation step S316, the nozzle operation control portion 73 controls the multiaxial arm (not shown), thereby moving the welding nozzle 5. As shown in FIG. 18, the welding nozzle 5 is disposed at a position that faces the first blocking bead 101C and the second blocking bead 101E, which are formed on the outside in the radial direction Dr on the target surface Mf, on a side of the central axis 2c on which the height in the vertical direction Dv is higher (the right side in FIG. 18).

In the upper tier blocking bead formation step S316, furthermore, the welding current set to the first welding current value AL is supplied to the welding nozzle 5 from the current supply portion 51, and arc welding is carried out. Therefore, the outer periphery-side blocking beads 101G on the upper tier side, which are continuous in the peripheral direction in an annular shape around the central axis 2c, are formed on the first blocking beads 101C and the second blocking beads 101E. At this time, the number of rows (two rows in the present disclosure) in the width direction Dw of the first blocking bead 101C and the second blocking bead 101E on the lower tier side is larger than the number of rows (one row in the present disclosure) in the width direction Dw of the blocking bead 101G on the upper tier side. Therefore, at the time of forming the blocking bead 101G on the upper tier side, molten metal is prevented from dropping beyond the first blocking bead 101C and the second blocking bead 101E on the lower tier side. In addition, at the time of forming the blocking beads 101G on the upper tier side, the target surface Mf is obliquely inclined downward from the outside in the width direction Dw toward the inside in the width direction Dw. Therefore, molten metal that forms the blocking bead 101G on the upper tier side is less likely to spread toward the outside in the width direction Dw from the first blocking bead 101C and the second blocking bead 101E on the lower tier side, and the molten metal is prevented from dropping from the target surface Mf.

Figure 19:
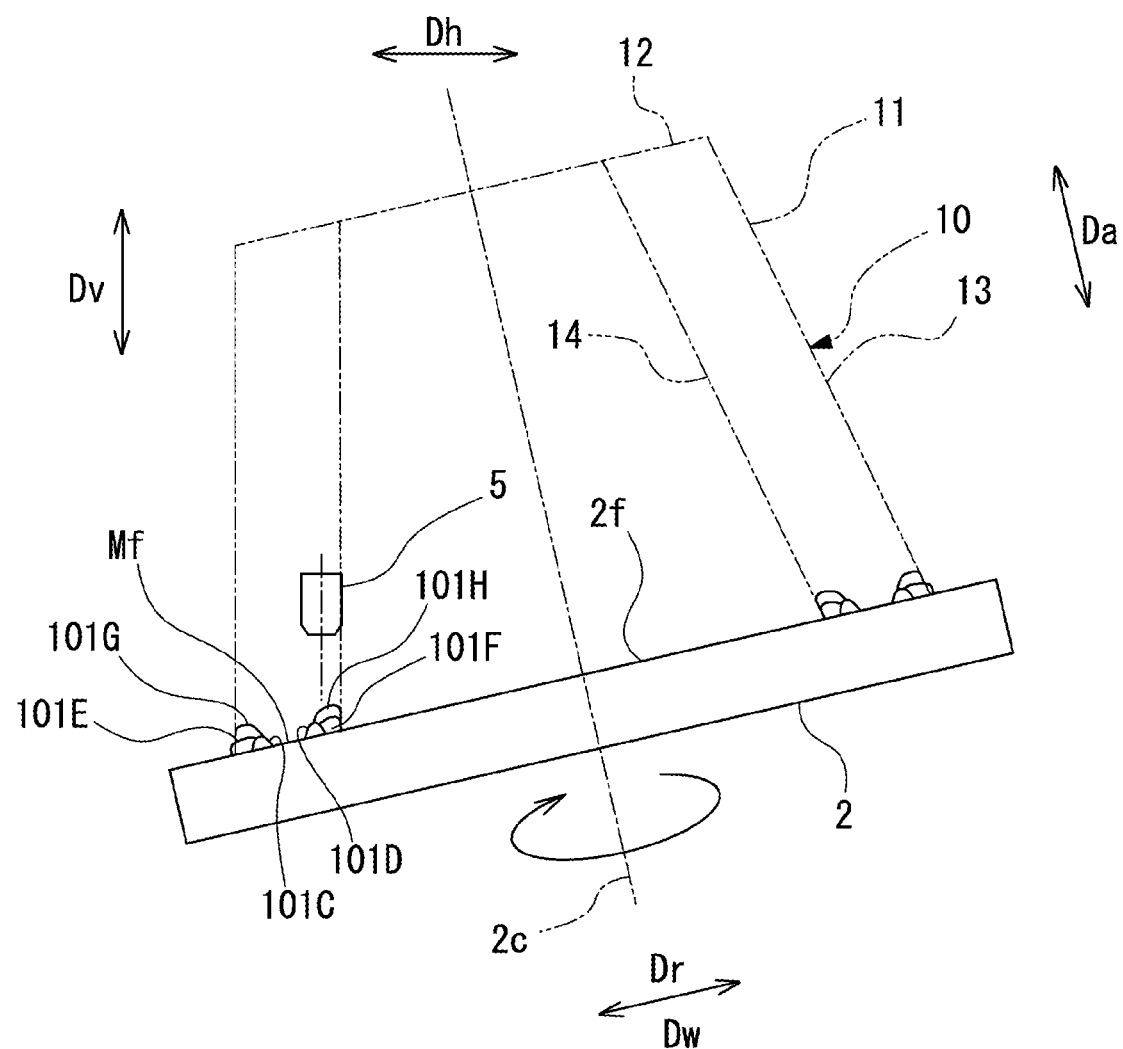
FIG. 19 is a view of a state subsequent to FIG. 18 in the upper tier blocking bead formation step according to the embodiment of the present disclosure.

FIG. 19 is a view of a state subsequent to FIG. 18 in the upper tier blocking bead formation step. In the upper tier blocking bead formation step S316, next, the nozzle operation control portion 73 controls the multiaxial arm (not shown), thereby moving the welding nozzle 5. As shown in FIG. 19, the welding nozzle 5 is disposed at a position that faces the first blocking bead 101D and the second blocking bead 101F, which are formed on the inner peripheral side on the target surface Mf, on a side of the central axis 2c on which the height in the vertical direction Dv is lower (the left side in FIG. 19).

In the upper tier blocking bead formation step S316, furthermore, the welding current set to the first welding current value AL is supplied to the welding nozzle 5 from the current supply portion 51, and arc welding is carried out. Therefore, the outer periphery-side blocking beads 101H on the upper tier side, which are continuous in the peripheral direction in an annular shape around the central axis 2c, are formed on the first blocking beads 101D and the second blocking beads 101F. At this time, the number of rows (two rows in the present disclosure) in the width direction Dw of the first blocking bead 101D and the second blocking bead 101F on the lower tier side is larger than the number of rows (one row in the present disclosure) in the width direction Dw of the blocking bead 101H on the upper tier side. Therefore, at the time of forming the blocking bead 101H on the upper tier side, molten metal is prevented from dropping beyond the first blocking bead 101D and the second blocking bead 101F on the lower tier side. In addition, at the time of forming the blocking beads 101H on the upper tier side, the target surface Mf is obliquely inclined downward from the outside in the width direction Dw toward the inside in the width direction Dw. Therefore, molten metal that forms the blocking bead 101H on the upper tier side is less likely to spread toward the outside in the width direction Dw from the first blocking bead 101D and the second blocking bead 101F on the lower tier side, and the molten metal is prevented from dropping from the target surface Mf.

(Step of Forming Inner Beads)

Figure 20:
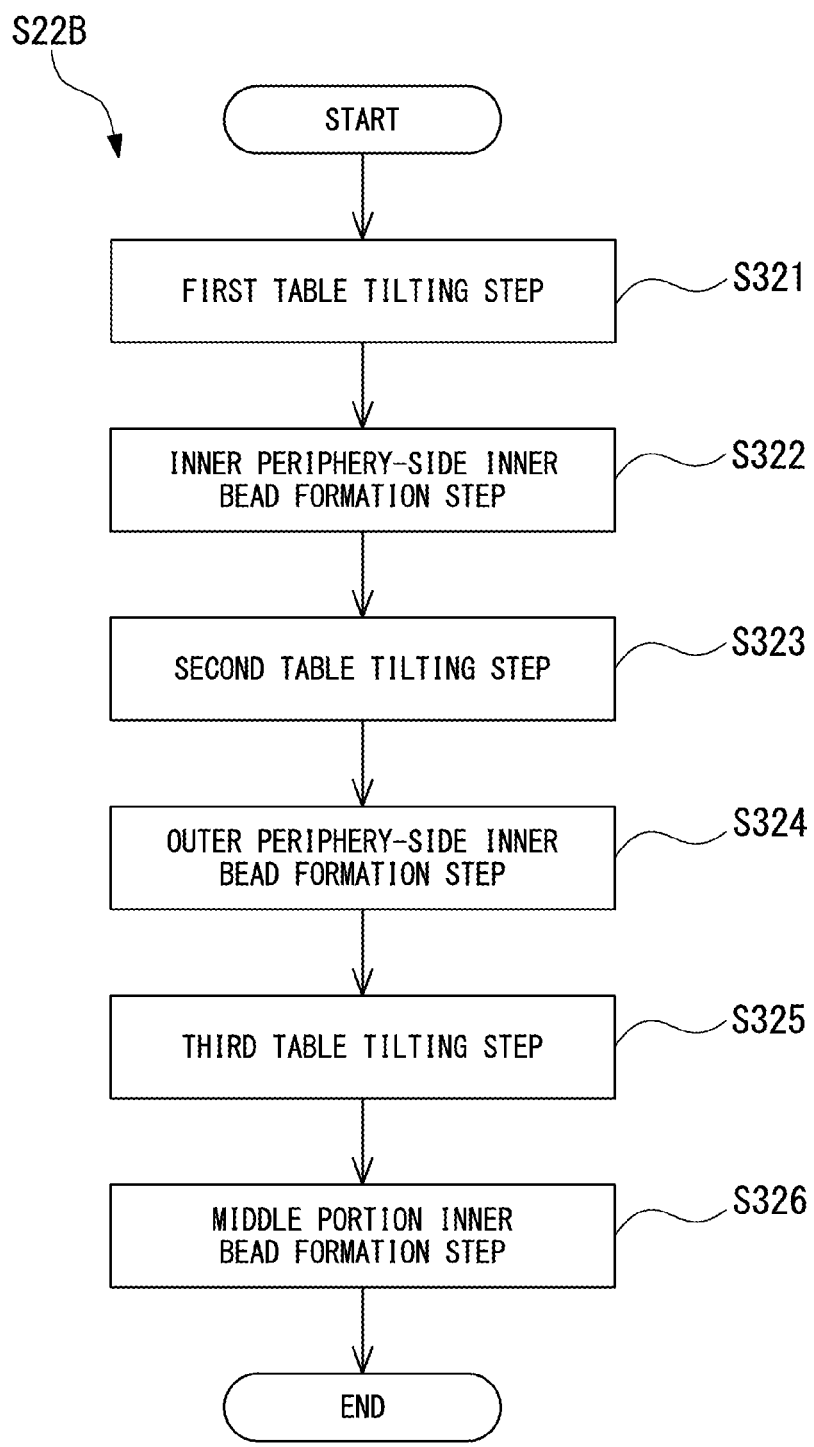
FIG. 20 is a flowchart of a step of forming inner beads according to the second embodiment of the present disclosure.

FIG. 20 is a flowchart of the step of forming inner beads.

As shown in FIG. 20, the step S22B of forming inner beads includes a first table tilting step S321, an inner periphery-side inner bead formation step S322, a second table tilting step S323, an outer periphery-side inner bead formation step S324, a third table tilting step S325, and a middle portion inner bead formation step S326.

Figure 21:
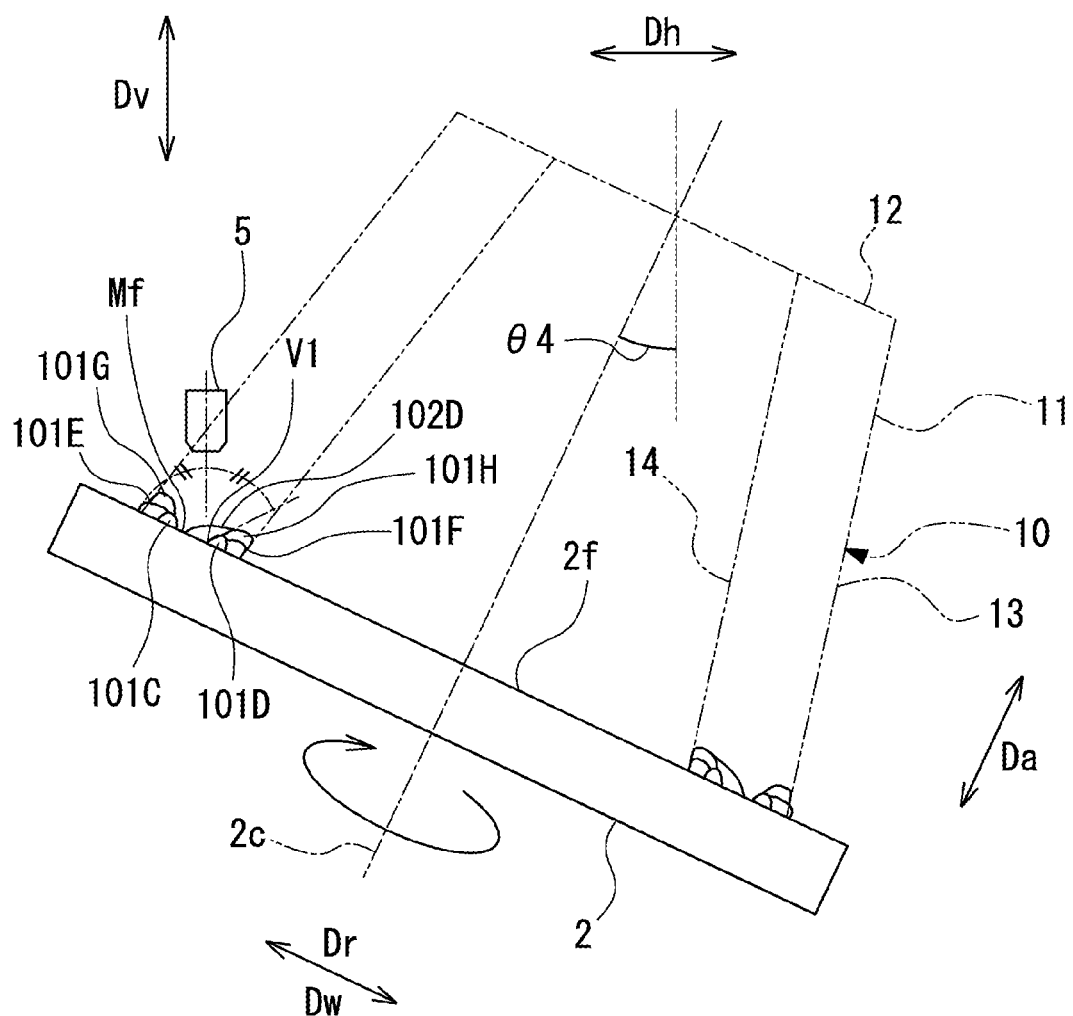
FIG. 21 is a view of an inner periphery-side inner bead formation step according to the embodiment of the present disclosure.

FIG. 21 is a view of the inner periphery-side inner bead formation step.

In the first table tilting step S321, the tilt control portion 72 controls the table tilting portion 4, thereby tilting the table 2 such that the central axis 2c of the table has a predetermined fourth inclination angle θ4 with respect to the vertical direction Dv as shown in FIG. 21. The fourth inclination angle θ4 is, for example, 0° to 20°. In the present embodiment, the table 2 is inclined such that the table upper surface 2f becomes higher on a first side (the left side in FIG. 21) of the central axis 2c than a second side (the right side in FIG. 21). Therefore, the target surface Mf is obliquely inclined downward from the inside in the width direction Dw toward the outside in the width direction Dw (the inside in the radial direction Dr of the tubular portion 11) on which that the first blocking bead 101D, the second blocking bead 101F, and the upper tier blocking bead 101H on the inner periphery side are formed. At this time, the target surface Mf is inclined such that the inclination between both sides of a valley portion V1 having a V-like cross-sectional shape, which is formed between the first blocking bead 101D, the second blocking bead 101F, and the upper tier blocking bead 101H and the target surface Mf that is on the inside of the first blocking bead, the second blocking bead, and the upper tier blocking bead in the width direction Dw, becomes symmetric to the welding nozzle 5. In other words, in the cross-sectional view of FIG. 21, the target surface Mf is inclined such that, when the nozzle center line (indicated by the dashed-dotted line in FIG. 21) of the welding nozzle 5 passes through the bottom portion of the valley portion V1 (in other words, a line that two surfaces forming the valley portion V1 intersect), the nozzle center line equally divides the inclination angle of the entire valley portion V1.

In the first table tilting step S321, the nozzle operation control portion 73 controls the multiaxial arm (not shown), thereby moving the welding nozzle 5. The welding nozzle 5 is disposed at a position that faces the valley portion V1, which is formed between the first blocking bead 101D, the second blocking bead 101F, and the upper tier blocking bead 101H and the target surface Mf that is on the inside of the first blocking bead, the second blocking bead, and the upper tier blocking bead in the width direction Dw. In the first table tilting step S321, the welding control portion 74 sets the welding current, which is to be supplied to the welding nozzle 5 in the current supply portion 51, to the second welding current value AH, which is higher than the first welding current value AL.

In the inner periphery-side inner bead formation step S322, the welding current set to the second welding current value AH is supplied to the welding nozzle 5 from the current supply portion 51, and arc welding is carried out. Therefore, inner periphery-side inner beads 102D, which are continuous in the peripheral direction in an annular shape around the central axis 2c, are formed using the valley portion V1, which is formed between the first blocking bead 101D, the second blocking bead 101F, and the upper tier blocking bead 101H and the target surface Mf that is on the inside the first blocking bead, the second blocking bead, and the upper tier blocking bead in the width direction Dw, as a groove.

Figure 22:
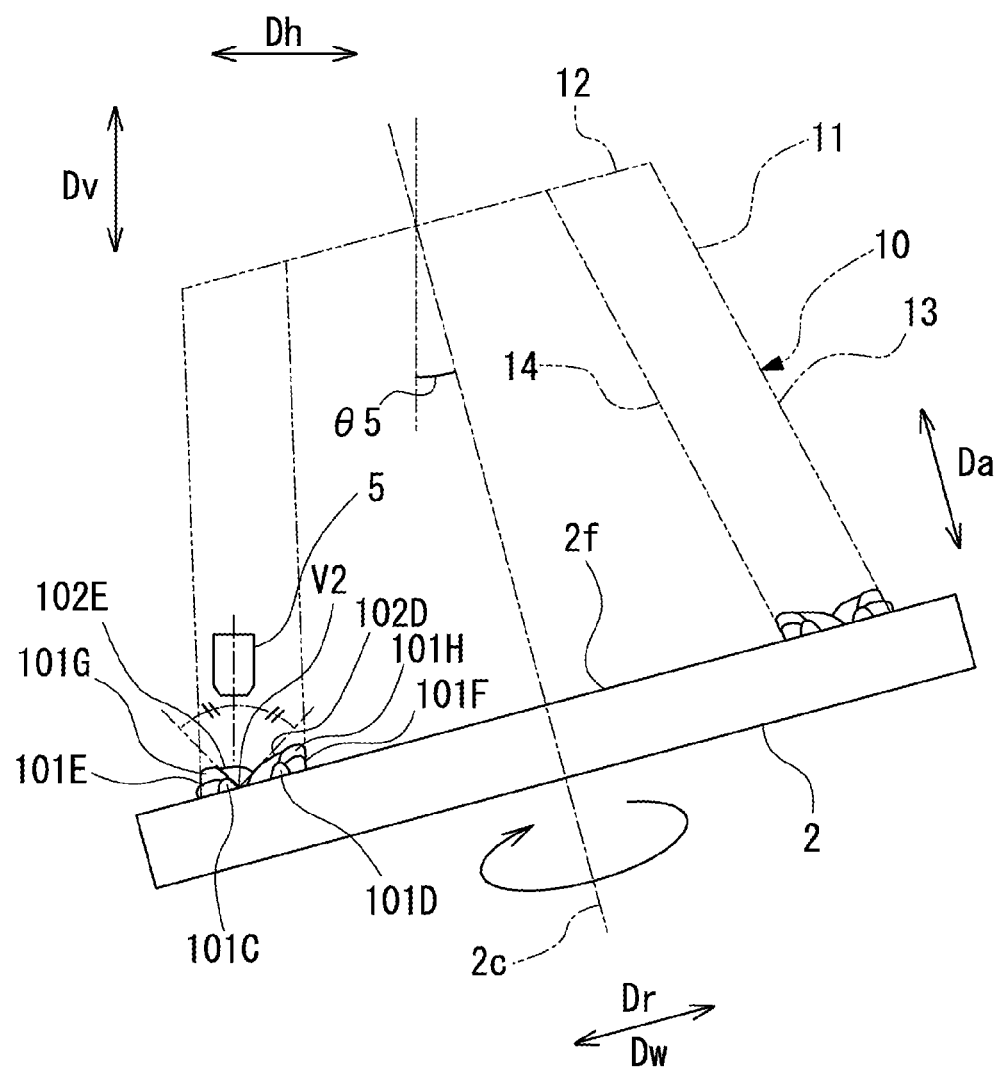
FIG. 22 is a view of an outer periphery-side inner bead formation step according to the embodiment of the present disclosure.

FIG. 22 is a view of the outer periphery-side inner bead formation step.

In the second table tilting step S323, the tilt control portion 72 controls the table tilting portion 4, thereby tilting the table 2 such that the central axis 2c of the table has a predetermined fifth inclination angle θ5 with respect to the vertical direction Dv as shown in FIG. 22.

The fifth inclination angle θ5 is, for example, 0° to 20°. The table 2 of the present embodiment is inclined such that the table upper surface 2f becomes higher on the second side (the right side in FIG. 22) of the central axis 2c than the first side (the left side in FIG. 22). Therefore, the target surface Mf is obliquely inclined downward from the inside in the width direction Dw toward the outside in the width direction Dw (the outside in the radial direction Dr of the tubular portion 11) on which that the first blocking bead 101C, the second blocking bead 101E, and the upper tier blocking bead 101G on the outer periphery side are formed. At this time, the target surface Mf is inclined such that the inclination between both sides of a valley portion V2 having a V-like cross-sectional shape, which is formed between the first blocking bead 101C, the second blocking bead 101E, and the upper tier blocking bead 101G on the outer periphery side and the inner periphery-side inner bead 102D on the inside in the width direction Dw, becomes symmetric to the welding nozzle 5. In other words, in the cross-sectional view of FIG. 22, the target surface Mf is inclined such that, when the nozzle center line (indicated by the dashed-dotted line in FIG. 22) of the welding nozzle 5 passes through the bottom portion of the valley portion V2 (in other words, a line that two surfaces forming the valley portion V2 intersect), the nozzle center line equally divides the inclination angle of the entire valley portion V2.

In the second table tilting step S323, the nozzle operation control portion 73 controls the multiaxial arm (not shown), thereby moving the welding nozzle 5. The welding nozzle 5 is disposed at a position that faces the valley portion V2, which is formed between the first blocking bead 101C, the second blocking bead 101E, and the upper tier blocking bead 101G on the outer periphery side and the inner periphery-side inner bead 102D on the inside in the width direction Dw.

In the outer periphery-side inner bead formation step S324, the welding current set to the second welding current value AH is supplied to the welding nozzle 5 from the current supply portion 51, and arc welding is carried out. Therefore, outer periphery-side inner beads 102E, which are continuous in the peripheral direction in an annular shape around the central axis 2c, are formed in the valley portion V2 between the first blocking bead 101C, the second blocking bead 101E, and the upper tier blocking bead 101G on the outer periphery side and the inner periphery-side inner bead 102D on the inside in the width direction Dw, as a groove.

Figure 23:
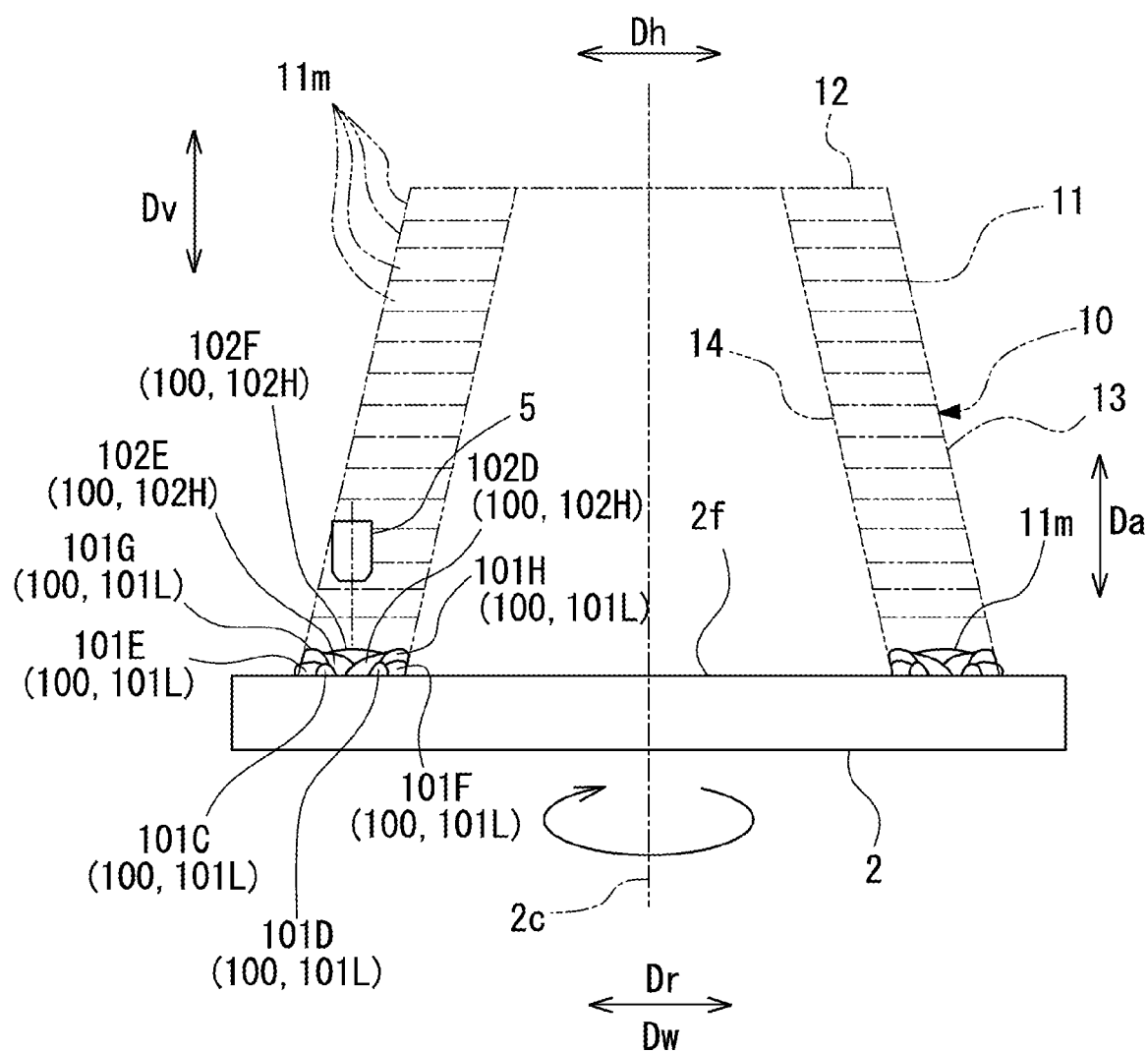
FIG. 23 is a view of a middle portion inner bead formation step according to the embodiment of the present disclosure.

FIG. 23 is a view of the middle portion inner bead formation step.

In the third table tilting step S325, the tilt control portion 72 controls the table tilting portion 4, thereby tilting the table 2 such that the central axis 2c of the table coincides with the vertical direction Dv as shown in FIG. 23. Therefore, the target surface Mf is directed upward in the vertical direction Dv. In the third table tilting step S325, furthermore, the nozzle operation control portion 73 controls the multiaxial arm (not shown), thereby moving the welding nozzle 5. The welding nozzle 5 is disposed at a position that faces the middle portion between the inner periphery-side inner bead 102D and the outer periphery-side inner bead 102E on the target surface Mf.

In the middle portion inner bead formation step S326, the welding current set to the second welding current value AH is supplied to the welding nozzle 5 from the current supply portion 51, and arc welding is carried out. Therefore, on the target surface Mf, the inner beads 102F in the middle portion, which are continuous in the peripheral direction in an annular shape around the central axis 2c, are formed between the inner periphery-side inner bead 102D and the outer periphery-side inner bead 102E. The inner bead 102F in the middle portion is formed so as to overlap both the inner periphery-side inner bead 102D and the outer periphery-side inner bead 102E. In addition, in a case where the dimension of the target surface Mf in the width direction Dw is large, the inner beads 102F in the middle portion may be formed in a plurality of rows in the width direction Dw between the inner periphery-side inner bead 102D and the outer periphery-side inner bead 102E by repeating the middle portion inner bead formation step S326 a plurality of times.

The metal layer 11m including, as the plurality of rows of weld beads 100, the blocking beads 101C to 101H on both sides in the width direction Dw and the inner beads 102D to 102F that fill the space on the inside of the blocking beads 101C to 101H in the width direction Dw of the target surface Mf on the target surface Mf is formed in the above-described manner. The blocking beads 101C to 101H are low-current solidified beads 101L that are formed by arc welding carried out at the first welding current value AL, which is lower than the second welding current value AH used at the time of forming the inner beads 102D to 102F. In addition, the inner beads 102D to 102F are high-current solidified beads 102H that are formed by arc welding carried out at the second welding current value AL, which is higher than the first welding current value AH used at the time of forming the blocking beads 101C to 101H. In addition, the inner beads 102D to 102F have a larger bead cross-sectional area than the blocking beads 101C to 101H when seen in the peripheral direction around the central axis 2c.

Next, similar to the first embodiment, the step S23 of moving the nozzle, the step S24 of cutting and levelling an upper surface, and the step S25 of confirming the final number of laminated layers are sequentially carried out. Therefore, the metal layers 11m are laminated as many as a predetermined final number of layers.

After that, the step S3 of forming a side surface and the step S4 of removing a modeled article are carried out, thereby modeling the modeled article 10 having a predetermined shape.

(Action and Effect)

In the metal laminating and modeling method S1B of the second embodiment, the step S2B of laminating a metal layer includes the step S21B of forming blocking beads and the step S22B of forming inner beads by arc welding with a current higher than the current in the step S21B of forming blocking beads.

Therefore, according to the metal laminating and modeling method SIB of the second embodiment, at the time of forming the inner beads 102D to 102F, molten metal is blocked by the blocking beads 101C to 101H formed on the target surface Mf along the outer peripheral shape of the modeled article 10. This configuration prevents the molten metal that forms the inner beads 102D to 102F from dropping on the outside of the target surface Mf. In addition, at the time of forming the blocking beads 101C to 101H, arc welding with a smaller current than the current for the inner beads 102D to 102F is used. Therefore, the molten metal that forms the blocking beads 101C to 101H is less likely to flow than the inner beads 102D to 102F, and it is possible to favorably form the blocking beads 101C to 101H while preventing the drop of the molten metal that forms the blocking beads 101C to 101H on the outside of the target surface Mf. Furthermore, the inner beads 102D to 102F are formed by arc welding with a current higher than the current for the blocking beads 101C to 101H. Therefore, it becomes possible to efficiently form the inner beads 102D to 102F. As a result, it becomes possible to prevent the molten metal from dropping on the outside of the target surface Mf and to model the modeled article 10 having a favorable quality at a high speed.

In addition, the blocking beads 101C to 101H are formed on both end portions of the target surface Mf in the width direction Dw in the step S21B of forming blocking beads of the metal laminating and modeling method S1B, and the inner beads 102D to 102F are formed so as to fill the space between the blocking beads 101C to 101H on both sides of the target surface Mf in the width direction Dw in the step S22B of forming inner beads.

Therefore, according to the metal laminating and modeling method SIB of the second embodiment, since the blocking beads 101C to 101H have been formed on both sides of the target surface Mf in the width direction Dw at the time of forming the inner beads 102D to 102F, the drop of the molten metal that forms the inner beads 102D to 102F on the outside of the target surface Mf is more effectively prevented.

In addition, the metal laminating and modeling method S1B of the second embodiment further includes the step S24 of cutting and levelling an upper surface.

Therefore, according to the metal laminating and modeling method S1B of the second embodiment, after the metal layer 11$m$ is laminated, the upper surface of the metal layer 11$m$ is cut and levelled, thereby preventing the generation of a gap between the blocking beads 101C to 101H and the inner beads 102D to 102F in the metal layer 11$m$ that is to be formed on the upper tier side and the upper surface of the metal layer 11$m$ on the lower tier side.

In addition, in the metal laminating and modeling method S1B of the second embodiment, the table 2 and the welding nozzle 5 are relatively rotated around the central axis 2$c$, thereby laminating the metal layers 11$m$ on the table 2.

Therefore, according to the metal laminating and modeling method S1B of the second embodiment, it is possible to easily form the tubular modeled article 10 on the table 2.

In addition, in the metal laminating and modeling method S1B of the second embodiment, in the step S21B of forming blocking beads, the blocking beads 101C and 101E, 101D and 101F are formed in a plurality of rows side by side in the width direction Dw of the target surface Mf, and the blocking beads 101G and 101H are formed on the upper tier side of the plurality of rows of blocking beads 101C and 101E, 101D and 101F in a smaller number of rows in the width direction Dw than the plurality of rows of blocking beads 101C and 101E, 101D and 101F.

Therefore, according to the metal laminating and modeling method SIB of the second embodiment, it is possible to increase the height of the blocking beads 101C to 101H, and it becomes possible to form a larger number of inner beads 102D to 102F at once. In addition, a larger number of rows of blocking beads 101C to 101H are formed on the lower tier side than on the upper tier side, thereby preventing the molten metal from dropping beyond the blocking bead 101C to 101F on the lower tier side at the time of forming the blocking bead 101G and 101H on the upper tier side.

In addition, in the metal laminating and modeling method S1B of the second embodiment, the first blocking beads 101C and 101F are formed at the positions the gap G1 or G2 apart inward in the width direction Dw from the edge portions Me1 and Me2 on the outside of the target surface Mf in the width direction Dw, and then the second blocking beads 101E and 101F are formed in a state in which the target surface Mf is obliquely inclined downward from the outside in the width direction Dw toward the inside in the width direction Dw.

Therefore, according to the metal laminating and modeling method SIB of the second embodiment, at the time of forming the first blocking beads 101C and 101D, since the gaps G1 and G2 extend up to the edge portions Me1 and Me2 on the outside of the target surface Mf in the width direction Dw, the molten metal that forms the first blocking beads 101C and 101D is prevented from dropping on the outside of the target surface Mf. In addition, at the time of forming the second blocking beads 101E and 101F, the target surface Mf is obliquely inclined downward from the outside in the width direction Dw toward the inside in the width direction Dw, whereby the molten metal that forms the second blocking beads 101E and 101F is blocked by the first blocking beads 101C and 101D that are positioned on the inside of the target surface Mf in the width direction Dw. In the above-described manner, the blocking beads 101C to 101H are effectively prevented from dropping on the outside of the target surface Mf.

In addition, in the metal laminating and modeling method S1B of the second embodiment, in the step S22B of forming inner beads, the inner beads 102D and 102E are formed in a state in which the target surface Mf is obliquely inclined downward from the inside in the width direction Dw toward the outside in the width direction Dw on which the blocking beads 101C to 101H are formed.

Therefore, according to the metal laminating and modeling method SIB of the second embodiment, at the time of forming the inner beads 102D and 102E, since the target surface Mf is obliquely inclined downward toward the outside in the width direction Dw on which the blocking beads 101C to 101H are formed, the molten metal that forms the inner beads 102D and 102E is effectively blocked by the blocking beads 101C to 101H.

In addition, in the metal laminating and modeling method S1B of the second embodiment, in the step S22B of forming inner beads, the target surface Mf is inclined such that the inclination of the valley portion V1 or V2 that is formed by the blocking beads 101C to 101H and the target surface Mf to be formed becomes symmetric to the welding nozzle 5 configured to carry out arc welding.

Therefore, according to the metal laminating and modeling method S1B of the second embodiment, the valley portions V1 and V2 that are formed by the blocking beads 101C to 101H and the target surface Mf to be formed serve as grooves at the time of carrying out arc welding for forming the inner beads 102D and 102E. The inclinations of the valley portions V1 and V2 that are formed by the blocking beads 101C to 101H and the target surface Mf to be formed are set to be symmetric to the welding nozzle 5, whereby molten metal that is generated by arc welding favorably melts into both the blocking beads 101C to 101H and the target surface Mf to be formed. Therefore, the inner beads 102D and 102E are formed in a manner of being favorably fused with both the blocking beads 101C to 101H and the target surface Mf.

In each layer of the metal layers 11*m* in the modeled article 10 of the second embodiment, the plurality of rows of weld beads 100 is disposed side by side in the width direction Dw. The plurality of rows of weld beads 100 includes the blocking beads 101C to 101H that are disposed outside in the width direction Dw and form the outer shape of the metal layer 11*m* and the inner beads 102D to 102F disposed on the inside of the blocking beads 101C to 101H in the width direction Dw. In addition, the inner beads 102D to 102F are the high-current solidified beads 102H than the blocking beads 101C to 101H.

Therefore, in the modeled article 10 of the second embodiment, in each layer of the metal layers 11*m*, the inner beads 102D to 102F become the high-current solidified beads 102H, and the blocking beads 101C to 101H become the low-current solidified beads 101L. Therefore, it becomes possible to prevent the molten metal from dropping on the outside of the target surface Mf and to efficiently form a modeled article having a favorable quality.

In addition, in the modeled article 10 of the second embodiment, the bead cross-sectional area of the inner beads 102D to 102F is larger than the bead cross-sectional area of the blocking beads 101C to 101H.

Therefore, since it is possible to arc-weld the inner beads 102D to 102F with a high current and to arc-weld the blocking beads 101C to 101H with a low current, the modeled article 10 of the second embodiment can be efficiently formed compared with a case where all weld beads are arc-welded with a low current.

Other Embodiments

Hitherto, the embodiments of the present disclosure have been described in detail with reference to the drawings, but the specific configuration is not limited to the embodiments and also includes design changes and the like within the scope not departing from the gist of the present disclosure.

In each of the embodiments, the blocking beads 101A to 101H are formed on both sides of the target surface Mf in the width direction Dw, but the configuration is not limited to this. For example, the blocking beads may be formed only one side of the target surface Mf in the width direction Dw.

In addition, in each of the embodiments, the step S24 of cutting and levelling the upper surface of the metal layer 11*m* is carried out every time the metal layer 11*m* is laminated, but the configuration is not limited to this. The metal layers 11*m* may be sequentially laminated without carrying out the step S24 of cutting and levelling the upper surface of the metal layer 11*m*.

In addition, in the second embodiment, the blocking beads 101C and 101E, 101D and 101F are formed in two rows side by side in the width direction Dw on the target surface Mf, and one row of the blocking beads 101G and 101H are formed on the upper tier side of the blocking beads, but the configuration is not limited to this. For example, three or more rows of blocking beads may be formed side by side in the width direction Dw of the target surface Mf on the lower tier side, and blocking rows may be formed on the lower tier side in a smaller number of rows than the three or more rows of blocking beads on the upper tier side. Furthermore, three or more tires of blocking beads may be laminated and formed on the target surface Mf, and the blocking beads on each tier may be formed such that the number of the blocking beads on the upper tier side becomes smaller than the number of the blocking beads on the lower tier side.

In addition, in the second embodiment, the target surface Mf is inclined such that the inclination of the valley portion V1 or V2 that is formed by the blocking beads 101C to 101H and the target surface Mf to be formed becomes symmetric to the welding nozzle 5 configured to carry out arc welding, but the configuration is not limited to this. The angles of the welding nozzle 5 with respect to the valley portions V1 and V2 can be changed as appropriate.

In addition, in each of the embodiments, it is possible to switch the order of the treatments carried out in the metal laminating and modeling methods S1A and S1B to an appropriate order. For example, in the steps S21A and S21B for forming blocking beads and in the steps S22A and S22B for forming inner beads, the order of the formation of the blocking beads 101A to 101H and the inner beads 102A to 102F on the outside in the radial direction Dr and on the inside in the radial direction Dr may be switched.

In addition, in each of the embodiments, the case where one welding nozzle 5 is used has been exemplified, but arc welding may be carried out using a plurality of welding nozzles.

<Appendix>

The metal laminating and modeling methods S1A and S1B and the modeled article 10 described in the respective embodiments are understood, for example, as described below.

(1) The metal laminating and modeling method S1A or S1B of a first aspect is the metal laminating and modeling method S1A or S1B that forms the modeled article 10 by sequentially carrying out the step S2A or S2B of laminating a metal layer, in which the step S2A or S2B of laminating a metal layer includes the step S21A or S21B of forming blocking beads, which are continuous along the outer peripheral shape of the modeled article 10, by arc welding on at least one end portion in the width direction Dw of the target surface Mf, on which the metal layers 11*m* are to be formed, and the step S22A or S22B of forming the inner beads by arc welding with a current higher than the current in the step S21A or S21B of forming blocking beads so as to fill the space on the inside of the blocking beads 101A to 101H in the width direction Dw of the target surface Mf.

According to the metal laminating and modeling method S1A or S1B, at the time of forming the inner beads 102A to 102F, molten metal is blocked by the blocking beads 101A to 101H formed on the target surface Mf along the outer peripheral shape of the modeled article 10. This configuration prevents the molten metal that forms the inner beads 102A to 102F from dropping on the outside of the target surface Mf. In addition, at the time of forming the blocking beads 101A to 101H, arc welding with a current lower than the current for the inner beads 102A to 102F is used.

Therefore, the molten metal that forms the blocking beads 101A to 101H is less likely to flow than the inner beads 102A to 102F, and it is possible to favorably form the blocking beads 101A to 101H while preventing the drop of the molten metal that forms the blocking beads 101A to 101H on the outside of the target surface Mf. Furthermore, the inner beads 102A to 102F are formed by arc welding with a current higher than the current for the blocking beads 101A to 101H. Therefore, it becomes possible to efficiently form the inner beads 102A to 102F. Therefore, it becomes possible to prevent the molten metal from dropping on the outside of the target surface Mf and to efficiently form the modeled article 10 having a favorable quality.

(2) The metal laminating and modeling method S1A or S1B of a second aspect is the metal laminating and modeling method S1A or S1B of (1), in which, in the step S21A or S21B of forming blocking beads, the blocking beads 101A to 101H are formed on both end portions of the target surface Mf in the width direction Dw, and, in the step S22A or S22B of forming inner beads, the inner beads 102A to 102F are formed so as to fill the space between the blocking beads 101A to 101H on both sides of the target surface Mf in the width direction Dw.

Therefore, since the blocking beads 101A to 101H have been formed on both sides of the target surface Mf in the width direction Dw at the time of forming the inner beads 102A to 102F, the drop of the molten metal that forms the inner beads 102A to 102F on the outside of the target surface Mf is more effectively prevented.

(3) The metal laminating and modeling method S1B of a third aspect is the metal laminating and modeling method S1B of (1) or (2), in which, in the step S21B of forming blocking beads, the blocking beads 101C and 101E, 101D and 101F are formed in a plurality of rows side by side in the width direction Dw of the target surface Mf, and the blocking beads 101G and 101H are formed on the upper tier side of the plurality of rows of blocking beads 101C and 101E, 101D and 101F in a smaller number of rows in the width direction Dw than the plurality of rows of blocking beads 101C and 101E, 101D and 101F.

Therefore, it is possible to increase the height of the blocking beads 101C to 101H, and it becomes possible to form a larger number of inner beads 102D to 102F at once. In addition, a larger number of rows of blocking beads 101C to 101H are formed on the lower tier side than on the upper tier side, thereby preventing the molten metal from dropping beyond the blocking bead 101C to 101F on the lower tier side at the time of forming the blocking bead 101G and 101H on the upper tier side.

(4) The metal laminating and modeling method S1B of a fourth aspect is the metal laminating and modeling method S1B according to any one of (1) to (3), in which, in the step S21B of forming blocking beads, the first blocking beads 101C and 101F are formed at the positions the gap G1 or G2 apart inward in the width direction Dw from the edge portions Me1 and Me2 on the outside of the target surface Mf in the width direction Dw, and then the second blocking beads 101E and 101F are formed adjacent to the first blocking beads 101C and 101D on the outside in the width direction Dw of the target surface Mf in a state in which the target surface Mf is obliquely inclined downward toward the inside of the width direction Dw from the outside in the width direction Dw.

Therefore, at the time of forming the first blocking beads 101C and 101D, since there are the gaps G1 and G2 extending up to the edge portions Me1 and Me2 on the outside of the target surface Mf in the width direction Dw, molten metal that forms the first blocking beads 101C and 101D is prevented from dropping on the outside of the target surface Mf. In addition, at the time of forming the second blocking beads 101E or 101F, the target surface Mf is obliquely inclined downward from the outside in the width direction Dw toward the inside in the width direction Dw. Therefore, the molten metal that forms the second blocking beads 101E or 101F is blocked by the first blocking beads 101C or 101D that are positioned on the inside of the target surface Mf in the width direction Dw. In the above-described manner, the blocking beads 101C to 101H are effectively prevented from dropping on the outside of the target surface Mf.

(5) The metal laminating and modeling method S1B of a fifth aspect is the metal laminating and modeling method S1B according to any one of (1) to (4), in which, in the step S22B of forming inner beads, the inner beads 102D and 102E are formed in a state in which the target surface Mf is obliquely inclined downward toward the outside in the width direction Dw, on which the blocking beads 101C to 101H are formed, from the inside in the width direction Dw.

Therefore, at the time of forming the inner beads 102D and 102E, since the target surface Mf is obliquely inclined downward toward the outside in the width direction Dw, on which the blocking beads 101C to 101H are formed, the molten metal that forms the inner beads 102D and 102E is effectively blocked by the blocking beads 101C to 101H.

(6) The metal laminating and modeling method S1B of a sixth aspect is the metal laminating and modeling method S1B of (5), in which, in the step S22B of forming inner beads, the target surface Mf is inclined such that the inclination of the valley portion V1 or V2 that is formed by the blocking beads 101C to 101H and the target surface Mf to be formed becomes symmetric to the welding nozzle 5 configured to carry out arc welding.

Therefore, the valley portions V1 and V2 that are formed by the blocking beads 101C to 101H and the target surface Mf to be formed serve as grooves at the time of carrying out arc welding for forming the inner beads 102D to 102E The inclinations of the valley portions V1 and V2 that are formed by the blocking beads 101C to 101H and the target surface Mf to be formed are set to be symmetric to the welding nozzle 5, whereby molten metal that is generated by arc welding favorably melts into both the blocking beads 101C to 101H and the target surface Mf to be formed. Therefore, the inner beads 102D and 102E are formed in a manner of being favorably fused with both the blocking beads 101C to 101H and the target surface Mf.

(7) The metal laminating and modeling method S1A or S1B of a seventh aspect is the metal laminating and modeling method S1A or S1B according to any one of (1) to (6), further including the step S24 of cutting and levelling the upper surface of the metal layer 11m.

Therefore, after the metal layer 11m is laminated, the upper surface of the metal layer 11m is cut and levelled, whereby the blocking beads 101A to 101H and the inner beads 102A to 102F in the metal layer 11m that is to be formed on the upper tier side are favorably formed by preventing the generation of a gap between the blocking beads and the inner beads on the upper tier side and the upper surface of the metal layer 11m on the lower tier side.

(8) The metal laminating and modeling method S1A or S1B of an eighth aspect is the metal laminating and modeling method S1A or S1B according to any one of (1) to (7), in which the table 2 that is provided so as to be rotatable around the central axis 2c and the welding nozzle 5 that is disposed above the table 2 and carries out arc welding are relatively rotated around the central axis 2c, thereby laminating the metal layers 11m on the table 2.

Therefore, it is possible to easily form the tubular modeled article 10 on the table 2 by laminating the metal layers 11m while relatively rotating the table 2 and the welding nozzle 5 around the central axis 2c of the table 2.

(9) The modeled article 10 according to a ninth aspect is the modeled article 10 formed by laminating a plurality of the metal layers 11m each formed of the weld beads 100, in which each layer of the metal layers 11m has the weld beads 100 disposed side by side in a plurality of rows in the width direction Dw, the plurality of rows of weld beads 100 includes the blocking beads 101A to 101H that are disposed on the outside in the width direction Dw and form the outer shape of the metal layer 11m and the inner beads 102A to 102F disposed on the inside of the blocking beads 101A to 101H in the width direction Dw, and the inner beads 102A to 102F are the high-current solidified beads 102H arc-welded with a current higher than the current for the blocking beads 101A to 101H.

As described above, the modeled article 10 in which the inner beads 102A to 102F on the inside in the width direction Dw are the high-current solidified beads 102H and the blocking beads 101A to 101H in the width direction Dw are the low-current solidified beads 101L in each layer of the metal layers 11m is formed by the above-described metal laminating and modeling method S1A or S1B that prevents molten metal from dropping on the outside of the target surface Mf and is capable of efficiently forming the modeled article 10 having a favorable quality.

(10) The modeled article 10 according to a tenth aspect is the modeled article 10 according to (9), in which the bead cross-sectional area of the inner beads 102A to 102F is larger than the bead cross-sectional area of the blocking beads 101A to 101H.

Therefore, the inner beads 102A to 102F formed by carrying out arc welding with a high current have a larger bead cross-sectional area than the blocking beads 101A to 101H formed by carrying out arc welding with a low current. Such a modeled article 10 is formed by the metal laminating and modeling method S1A or S1B that prevents molten metal from dropping on the outside of the target surface Mf and is capable of efficiently forming the modeled article 10 having a favorable quality.

EXPLANATION OF REFERENCES 1 modeling system
2 table
2c central axis
2f table upper surface
3 table rotary-driving portion
4 table tilting portion
5 welding nozzle
6 controller
8 cutting tool
10 modeled article
11 tubular portion
11a tube end
11b tube end
11m metal layer
12 top surface
12a outside end portion
12b inside end portion
13 outer peripheral surface
14 inner peripheral surface
51 current supply portion
61 CPU
62 ROM
63 RAM
64 HDD
65 signal receiving module
70 signal input portion
71 rotation control portion
72 tilt control portion
73 nozzle operation control portion
74 welding control portion
100 weld bead
101A to 101H blocking bead
102A to 102F inner bead
101L low-current solidified bead
102H high-current solidified bead
105 side surface weld bead
Da axial direction
De extension direction
Dh horizontal direction
Dr radial direction
Dv vertical direction
Dw width direction
G1 gap
G2 gap
AH second welding current value
AL first welding current value
Me1 edge portion
Me2 edge portion
Mf target surface
S1A, S1B metal laminating and modeling method
S2A, S2B step of laminating metal layer
S3 step of forming side surface
S4 step of removing modeled article
S21A, S21B step of forming blocking beads
S211 first preparation step
S212 blocking bead formation step
S213 nozzle movement step
S214 first nozzle movement step
S22A, S22B step of forming inner beads
S221 second preparation step
S222 outer periphery-side inner bead formation step
S223 second nozzle movement step
S224 inner periphery-side inner bead formation step
S225 third preparation step
S226 middle portion inner bead formation step
S23 step of moving the nozzle
S24 step of cutting and levelling upper surface
S25 step of confirming the final number of laminated layers
S31 fourth preparation step
S311 preparation step
S312 blocking bead formation step
S313 table tilting step
S314 blocking bead formation step
S315 nozzle movement step
S316 blocking bead formation step
S32 outer peripheral surface weld bead formation step
S321 first table tilting step
S322 inner periphery-side inner bead formation step
S323 second table tilting step
S324 outer periphery-side inner bead formation step
S325 third table tilting step
S326 middle portion inner bead formation step
V1, V2 valley portion
θ1 first inclination angle
θ2 second inclination angle
θ3 third inclination angle
θ4 fourth inclination angle
θ5 fifth inclination angle

What is claimed is:

1. A metal laminating and modeling method comprising:
sequentially carrying out a step of laminating a metal layer to form a modeled article, wherein
the step of laminating a metal layer includes
- a step of forming blocking beads that are continuous along an outer peripheral shape of the modeled article is formed by arc welding on at least one end portion in a width direction of a target surface on which metal layers are to be formed, and
- a step of forming inner beads by arc welding with a current higher than a current in the step of forming blocking beads so as to fill a space on an inside of the blocking beads in the width direction of the target surface, and in the step of forming blocking beads,
- first blocking beads are formed at positions spaced inward in the width direction from an edge portion on an outside in the width direction of the target surface, and then,
- in a state in which the target surface is obliquely inclined downward from the outside in the width direction toward an inside in the width direction, second blocking beads are formed adjacent to the first blocking beads on the outside in the width direction of the target surface.

2. The metal laminating and modeling method according to claim 1, wherein
in the step of forming blocking beads, the blocking beads are formed on both end portions of the target surface in the width direction, and
in the step of forming inner beads, the inner beads are formed so as to fill a space between the blocking beads on both sides in the width direction of the target surface.

3. The metal laminating and modeling method according to claim 1, wherein, in the step of forming blocking beads, a plurality of rows of the blocking beads is formed side by side in the width direction on the target surface, and the blocking beads are formed on an upper tier side of the plurality of rows of blocking beads in a smaller number of rows than the plurality of rows of blocking beads in the width direction.

4. The metal laminating and modeling method according to claim 1, further comprising:
a step of cutting and levelling an upper surface of the metal layer.

5. The metal laminating and modeling method according to claim 1, wherein a table provided so as to be rotatable around a central axis and a welding nozzle that is disposed above the table and carries out arc welding are relatively rotated around the central axis, thereby laminating the metal layers on the table.

6. A metal laminating and modeling method comprising:
sequentially carrying out a step of laminating a metal layer to form a modeled article, wherein
the step of laminating a metal layer includes
- a step of forming blocking beads that are continuous along an outer peripheral shape of the modeled article is formed by arc welding on at least one end portion in a width direction of a target surface on which metal layers are to be formed, and
- a step of forming inner beads by arc welding with a current higher than a current in the step of forming blocking beads so as to fill a space on an inside of the blocking beads in the width direction of the target surface, wherein in the step of forming inner beads, the inner beads are formed in a state in which the target surface is obliquely inclined downward from an inside in the width direction toward an outside in the width direction on which the blocking beads are formed.

7. The metal laminating and modeling method according to claim 6, wherein, in the step of forming inner beads, the target surface is inclined such that an inclination of a valley portion that is formed by the blocking beads and the target surface is symmetric to a welding nozzle that carries out arc welding.

8. The metal laminating and modeling method according to claim 6, wherein
in the step of forming blocking beads, the blocking beads are formed on both end portions of the target surface in the width direction, and
in the step of forming inner beads, the inner beads are formed so as to fill a space between the blocking beads on both sides in the width direction of the target surface.

9. The metal laminating and modeling method according to claim 6, wherein, in the step of forming blocking beads, a plurality of rows of the blocking beads is formed side by side in the width direction on the target surface, and the blocking beads are formed on an upper tier side of the plurality of rows of blocking beads in a smaller number of rows than the plurality of rows of blocking beads in the width direction.

10. The metal laminating and modeling method according to claim 6, further comprising:
a step of cutting and levelling an upper surface of the metal layer.

11. The metal laminating and modeling method according to claim 6, wherein a table provided so as to be rotatable around a central axis and a welding nozzle that is disposed above the table and carries out arc welding are relatively rotated around the central axis, thereby laminating the metal layers on the table.

* * * * *

UNITED STATES PATENT AND TRADEMARK OFFICE
CERTIFICATE OF CORRECTION

PATENT NO. : 11,850,687 B2  
APPLICATION NO. : 17/022357  
DATED : December 26, 2023  
INVENTOR(S) : Sakai et al.

Page 1 of 1

It is certified that error appears in the above-identified patent and that said Letters Patent is hereby corrected as shown below:

On the Title Page

Item (12), should read:  
Sakai et al.

Item (72), should read:  
Yasunori Sakai, Hiroshima (JP);  
Kazuhiro Ishibashi, Aichi (JP);  
Yasuyuki Tanaka, Aichi (JP);  
Atsushi Suzuki, Aichi (JP);  
Seigo Ouchi, Aichi (JP)

Signed and Sealed this  
Nineteenth Day of August, 2025

Coke Morgan Stewart  
*Acting Director of the United States Patent and Trademark Office*